United States Patent
Hu et al.

(10) Patent No.: US 9,411,354 B2
(45) Date of Patent: Aug. 9, 2016

(54) DEVICE AND MODULE OF TRIGGERING AND GENERATING TEMPERATURE COEFFICIENT CURRENT

(75) Inventors: Min-Hung Hu, Hsinchu (TW); Chen-Tsung Wu, Kaohsiung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 828 days.

(21) Appl. No.: 13/543,888

(22) Filed: Jul. 9, 2012

(65) Prior Publication Data
US 2013/0009622 A1 Jan. 10, 2013

(30) Foreign Application Priority Data
Jul. 7, 2011 (TW) .............................. 100124018 A

(51) Int. Cl.
*G05F 1/46* (2006.01)
*G05F 3/30* (2006.01)
(52) U.S. Cl.
CPC ...................................... *G05F 3/30* (2013.01)
(58) Field of Classification Search
USPC ........................................................ 327/513
See application file for complete search history.

(56) References Cited

U.S. PATENT DOCUMENTS

| 6,356,161 | B1 | 3/2002 | Nolan | |
|---|---|---|---|---|
| 7,532,056 | B2 * | 5/2009 | Seo | G01K 7/00 323/907 |
| 7,543,253 | B2 * | 6/2009 | Marinca | H03F 1/30 323/313 |
| 7,920,015 | B2 | 4/2011 | Chellappa | |
| 2006/0197452 | A1 * | 9/2006 | Zhang | 315/32 |
| 2008/0210848 | A1 * | 9/2008 | Purcell | 250/208.1 |
| 2009/0207645 | A1 * | 8/2009 | Parkinson | 365/145 |
| 2012/0293238 | A1 * | 11/2012 | Chen | G01K 3/10 327/512 |

FOREIGN PATENT DOCUMENTS

| CN | 101950191 A | 1/2011 |
|---|---|---|
| EP | 1 126 352 A1 | 8/2001 |
| TW | 200925572 | 6/2009 |

* cited by examiner

*Primary Examiner* — Lincoln Donovan
*Assistant Examiner* — Patrick Chen
(74) *Attorney, Agent, or Firm* — Winston Hsu; Scott Margo

(57) ABSTRACT

A device of triggering and generating temperature coefficient current for generating a temperature coefficient current includes a positive temperature coefficient current generating unit, for generating a first positive temperature coefficient current, a negative temperature coefficient current generating unit, for generating a first negative temperature coefficient current, and a triggering unit, for triggering to generate the temperature coefficient current according to a triggering temperature and a current difference between the first positive temperature coefficient current and the first negative temperature coefficient current.

45 Claims, 15 Drawing Sheets

DEVICE AND MODULE OF TRIGGERING AND GENERATING TEMPERATURE COEFFICIENT CURRENT

BACKGROUND OF THE INVENTION

1. Field of the Invention

The present invention relates to a device and module of triggering and generating temperature coefficient current, and more particularly, to a device and module of triggering and generating temperature coefficient current capable of utilizing current canceling effect to smooth temperature coefficient current with simple circuit during state switching around a triggering temperature.

2. Description of the Prior Art

Because of characteristics of semiconductors, an output current of a current source is designed to be with temperature coefficient, i.e. the output current varies with environment temperature, among many applications, so as to compensate a temperature effect due to non-ideal factors of different circuits.

For example, please refer to FIG. 1, which is a schematic diagram of a conventional dual capacitor oscillator 10. In short, an ideal oscillating frequency $f_{ideal}$ of the dual capacitor oscillator 10 can be denoted as $$f_{ideal} = \frac{I_c}{2C_f V_{ref}},$$

which means a current Ic provided from a current source determines the ideal oscillating frequency $f_{ideal}$. However, the ideal oscillating frequency $f_{ideal}$ is influenced by temperature due to non-ideal effects of the dual capacitor oscillator 10, and thus after summing every critical factor the relation between temperature and frequency, i.e. temperature coefficient, is non-linear, and frequency varies significantly within a specific temperature range. In such a situation, a current source designer must take the non-linear temperature coefficient into consideration, such that the current Ic provided to the dual capacitor oscillator 10 compensates a frequency shift of the dual capacitor oscillator 10. In other words, if the frequency increases as temperature increases within a specific temperature range after summing different influencing factors, there is a need to design a current Ic decreases as temperature increases within the specific temperature range to offset frequency shift causing by the influencing factors.

Please refer to FIG. 2, which is a schematic diagram of a conventional current source 20 with non-linear temperature coefficient. As shown in FIG. 2, the current source 20 includes a conventional energy bandgap reference circuit 202, a triggering unit 204 and a generating unit 206. In short, the conventional energy bandgap reference circuit 202 provides voltages and currents with or without temperature coefficients to the triggering unit 204, and thus the triggering unit 204 triggers to control the switch generating unit 206 to output in some specific temperature conditions, such that the generating unit 206 outputs an output current Iout with temperature coefficient.

For example, the conventional energy bandgap reference circuit 202 provides a voltage $V_{ZTC}$ with zero temperature coefficient to a positive input terminal of a comparator 208 of the triggering unit 204. And the triggering unit 204 generates a current $I_{PTC}$ with positive temperature coefficient via a transistor M1 of a current mirror, such that the current $I_{PTC}$ with positive temperature coefficient flows through a resistor $R_{PTC}$, and is transferred into a voltage $V_{PTC}$ with positive temperature coefficient to a negative input terminal of the comparator 208. The comparator 208 compares the voltage $V_{PTC}$ with zero temperature coefficient with the voltage $V_{PTC}$ with positive temperature coefficient, so as to output a control signal Vcon to control the switch generating unit 206 to output. Method of the conventional energy bandgap reference circuit 202 providing the voltage $V_{ZTC}$ with zero temperature coefficient and the current $I_{PTC}$ with positive temperature coefficient is well known by those skilled in the art, and is not narrated hereinafter.

Besides, in the generating unit 206, an amplifier 210 is arranged to utilize feedback to lock a voltage of a positive input terminal of the amplifier 210 in the zero temperature coefficient voltage $V_{ZTC}$, which means when the voltage of the positive input terminal of the amplifier 210 is less than the voltage $V_{ZTC}$ with zero temperature coefficient, a transistor M2 is turned on to pull the voltage of the positive input terminal of the amplifier 210 high. Thus, the generating unit 206 can generate a zero temperature coefficient current $I_{ZTC}$ flowing through a resistor $R_{ZTC}$, and then a transistor M3 of a current mirror is utilized for generating the current $I_{ZTC}$ with zero temperature coefficient to a high voltage level input terminal of a multiplexer 212. On the other hand, a transistor M4 of another current mirror is utilized for generating the positive temperature coefficient current $I_{PTC}$ to a low voltage input terminal of the multiplexer 212. And then, the multiplexer 212 switches to output the zero temperature coefficient current $I_{ZTC}$ and the positive temperature coefficient current $I_{PTC}$ according to the control signal Vcon.

Noticeably, the example shown in FIG. 2 is designed that the zero temperature coefficient voltage $V_{ZTC}$ equals the positive temperature coefficient voltage $V_{PTC}$ when the environment temperature is a triggering temperature $T_{trigger}$. In such a situation, please refer to FIG. 3, which is a schematic diagram of the output current Iout, the zero temperature coefficient current $I_{ZTC}$ and the positive temperature coefficient current $I_{PTC}$ shown in FIG. 2 under an ideal condition. As shown in FIG. 2 and FIG. 3, when the environment temperature is lower than the triggering temperature $T_{trigger}$, the comparator 208 outputs the control signal Vcon at a high voltage level, such that the multiplexer 212 selects the zero temperature coefficient current $I_{ZTC}$ as the output current Iout. When the environment temperature increases, the positive temperature coefficient voltage $V_{PTC}$ increases accordingly; when the environment temperature is higher than the triggering temperature $T_{trigger}$, the positive temperature coefficient voltage $V_{PTC}$ is greater than the zero temperature coefficient voltage $V_{ZTC}$, such that the control signal Vcon outputted by the comparator 208 is switched to a low voltage level, and thus the multiplexer 212 selects the positive temperature coefficient current $I_{PTC}$ as the output current Iout. As a result, the output current Iout has zero temperature coefficient when the environment temperature is lower than the triggering temperature $T_{trigger}$; and when the environment temperature is higher than the triggering temperature $T_{trigger}$, the output current Iout has the positive temperature coefficient to cancel the negative temperature coefficient in the circuit, and thus the output current Iout has a non-linear temperature coefficient within a whole temperature range.

However, the current source 20 utilizes the comparator 208 to compare voltages to determine temperature and then decides the output current Iout accordingly. In such a situation, the circuit structure is more complicated, i.e. a basic structure of the comparator 208 requires at least 5 transistors for making a simple operation amplifier, and such a method of digital switching may have current discontinuity due to some manufacturing process factors. As shown in FIG. 3, the output current Iout forms a turning point of current to temperature at the triggering temperature $T_{trigger}$, and the zero temperature coefficient current $I_{ZTC}$ and the positive temperature coefficient current $I_{PTC}$ must be the same $I_{trigger}$ at the turning point. If the zero temperature coefficient current $I_{ZTC}$ and the positive temperature coefficient current $I_{PTC}$ are not matched at triggering the temperature $T_{trigger}$ due to manufacturing process drift, the output current Iout appears discontinuous when the environment temperature across the turning point due to digital switching.

For example, please refer to FIG. 4, which is a schematic diagram of the output current Iout, the zero temperature coefficient current $I_{ZTC}$ and the positive temperature coefficient current $I_{PTC}$ shown in FIG. 2 under a non-ideal condition. As shown in FIG. 4, if the positive temperature coefficient current $I_{PTC}$ does not equal the zero temperature coefficient current $I_{ZTC}$ at the triggering temperature $T_{trigger}$ due to manufacturing process drift, the output current Iout may be discontinuous.

In addition, it is difficult for the conventional structure to provide a current with temperature coefficient including multiple turning points, and the temperature coefficients before and after a turning point change greatly due to output state switching of the comparator 208, i.e. digital operation, which is difficult to adjust arbitrarily and increases layout area and power consumption for compensating different temperatures. Besides, if the traditional energy bandgap reference circuit 202 tends to generate the negative temperature coefficient current, a resistor with a resistance L*R is further needed to balance the negative temperature coefficient current, which causes the waste of large layout area. Therefore, there is a need to improve the prior art.

SUMMARY OF THE INVENTION

It is therefore an object of the present invention to provide a device and module of triggering and generating temperature coefficient current utilizing current canceling effect with simpler circuit, such that the temperature coefficient currents are smoother before and after triggering temperature state transferring.

The present invention discloses a device of triggering and generating temperature coefficient current, for generating a temperature coefficient current, the device including a positive temperature coefficient current generating unit, for generating a first positive temperature coefficient current; a negative temperature coefficient current generating unit, for generating a first negative temperature coefficient current; and a triggering unit, for triggering to generate the temperature coefficient current according to a triggering temperature and a current difference between the first positive temperature coefficient current and the first negative temperature coefficient current.

The present invention further discloses a temperature coefficient current triggering generating module, for generating a total temperature coefficient current, including a plurality of temperature coefficient current triggering devices, for generating a plurality of temperature coefficient currents, respectively, each temperature coefficient current triggering devices includes a positive temperature coefficient current generating unit, for generating a first positive temperature coefficient current; a negative temperature coefficient current generating unit, for generating a first negative temperature coefficient current; and a triggering unit, for triggering to generate the temperature coefficient current according to a triggering temperature and a current difference between the first positive temperature coefficient current and the first negative temperature coefficient current; and a summation unit, for summing the plurality of temperature coefficient currents, to generate the total temperature coefficient current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
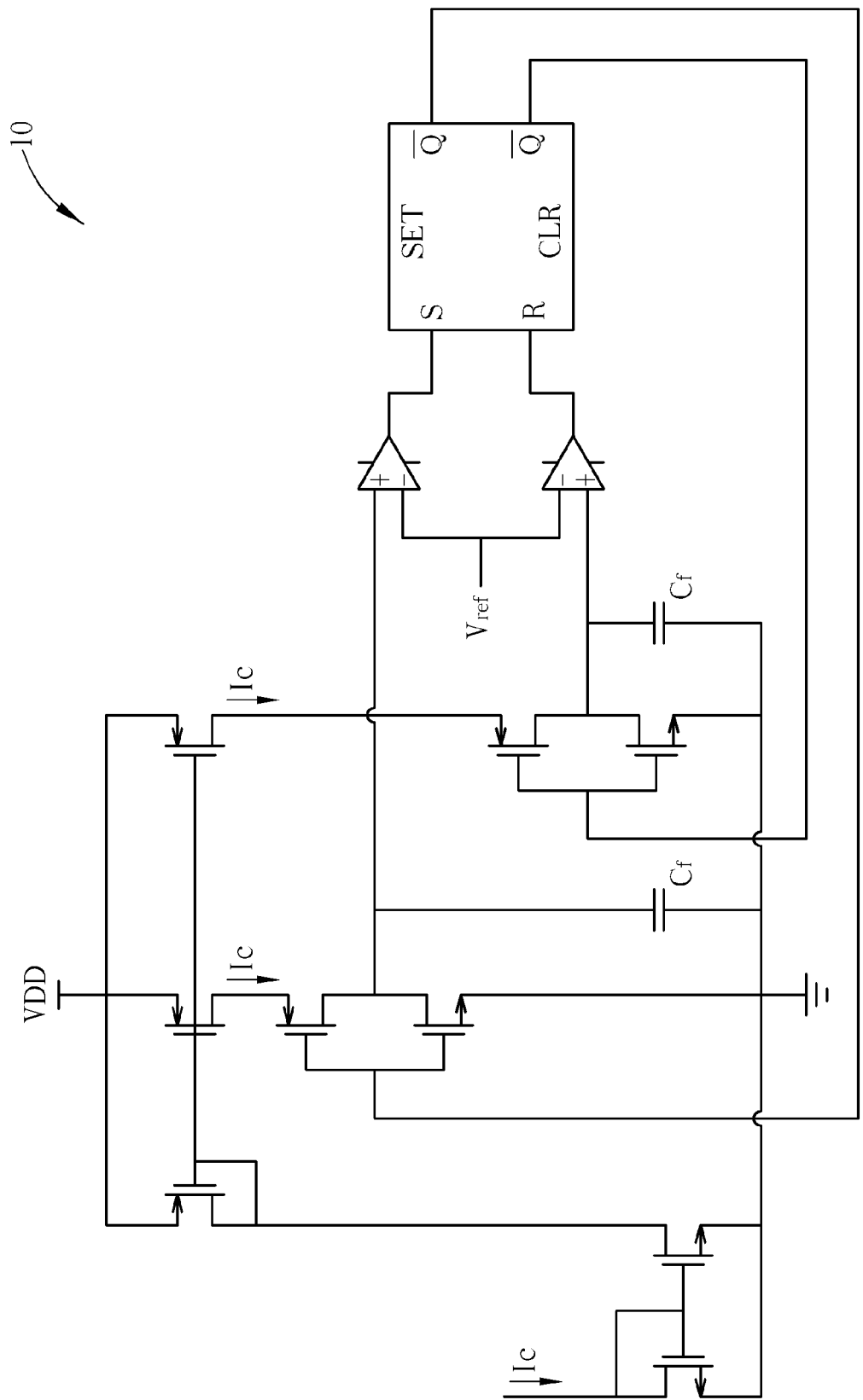
FIG. 1 is a schematic diagram of a conventional dual capacitor oscillator.
Figure 2:
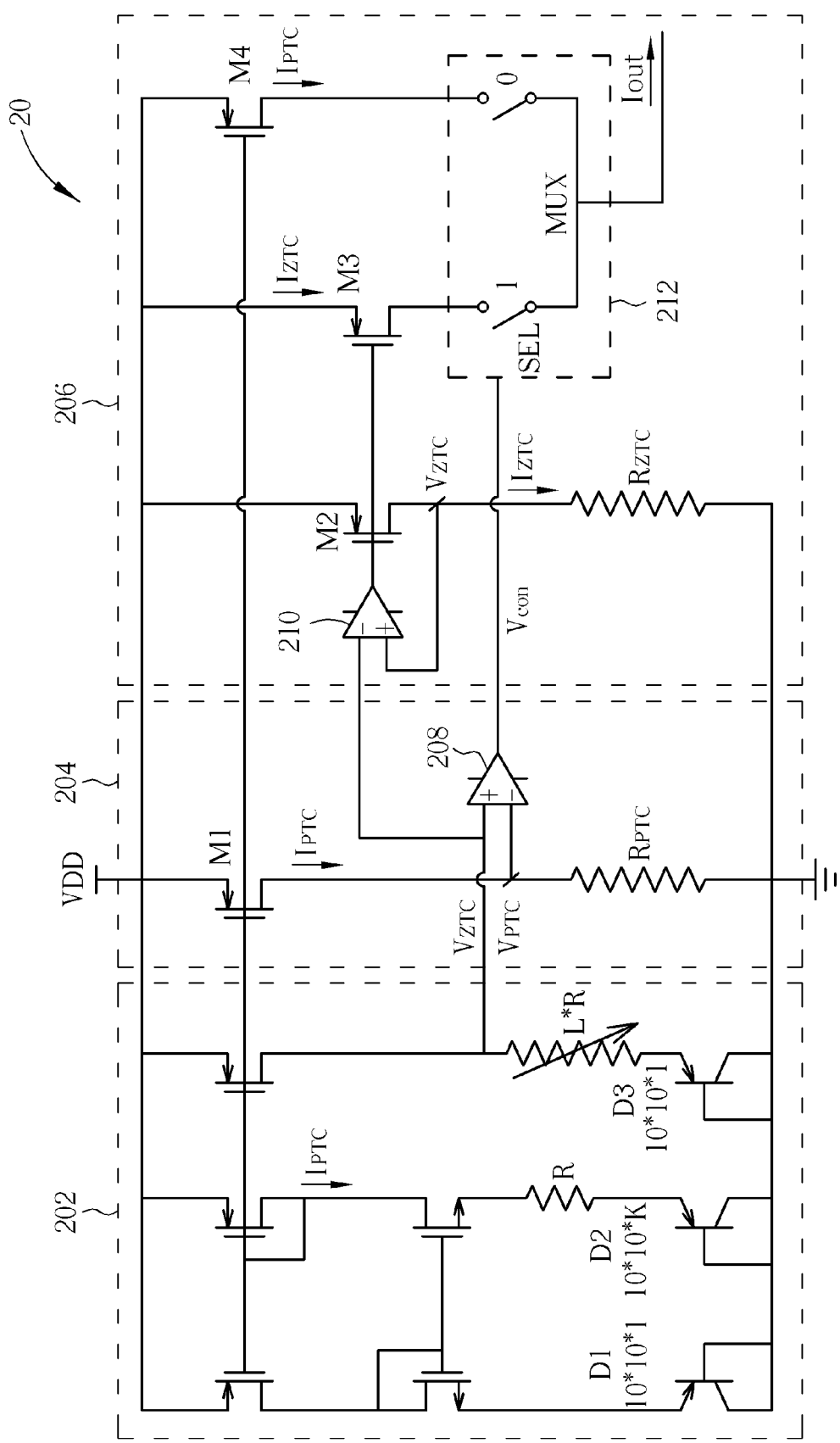
FIG. 2 is a schematic diagram of a conventional current source with non-linear temperature coefficient.
Figure 3:
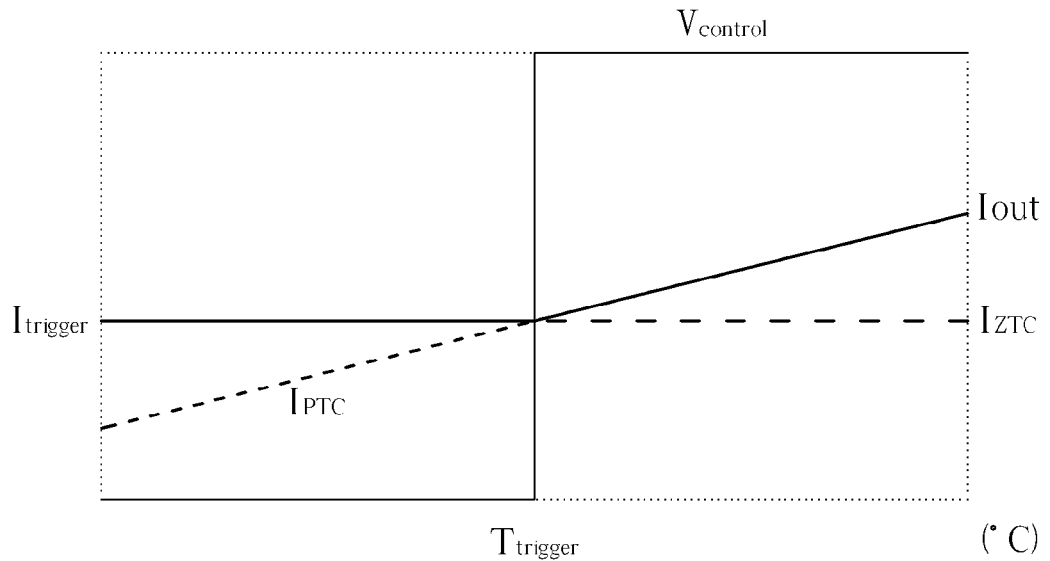
FIG. 3 is a schematic diagram of the output current, the zero temperature coefficient current and the positive temperature coefficient current shown in FIG. 2 under ideal condition.
Figure 4:
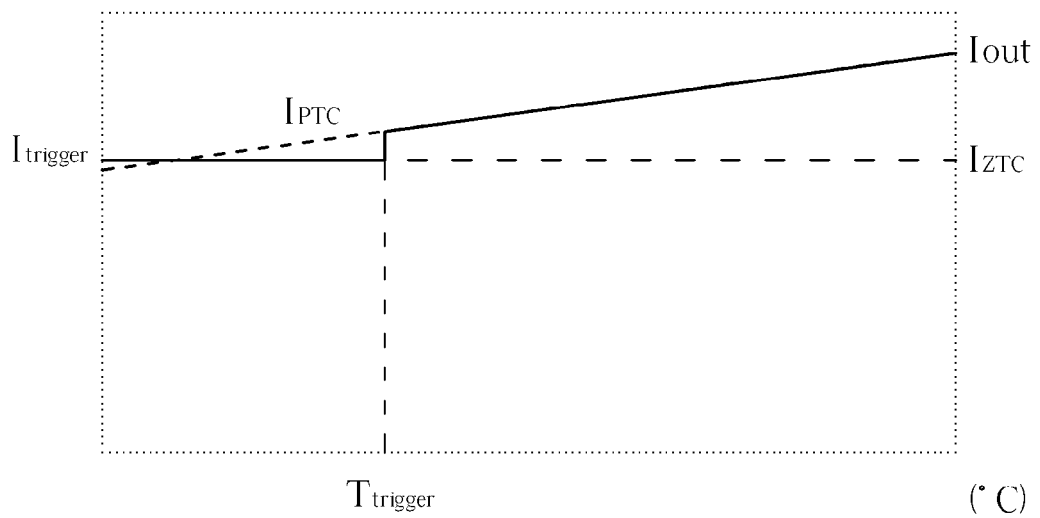
FIG. 4 is a schematic diagram of the output current, the zero temperature coefficient current and the positive temperature coefficient current shown in FIG. 2 under non-ideal condition.
Figure 5:
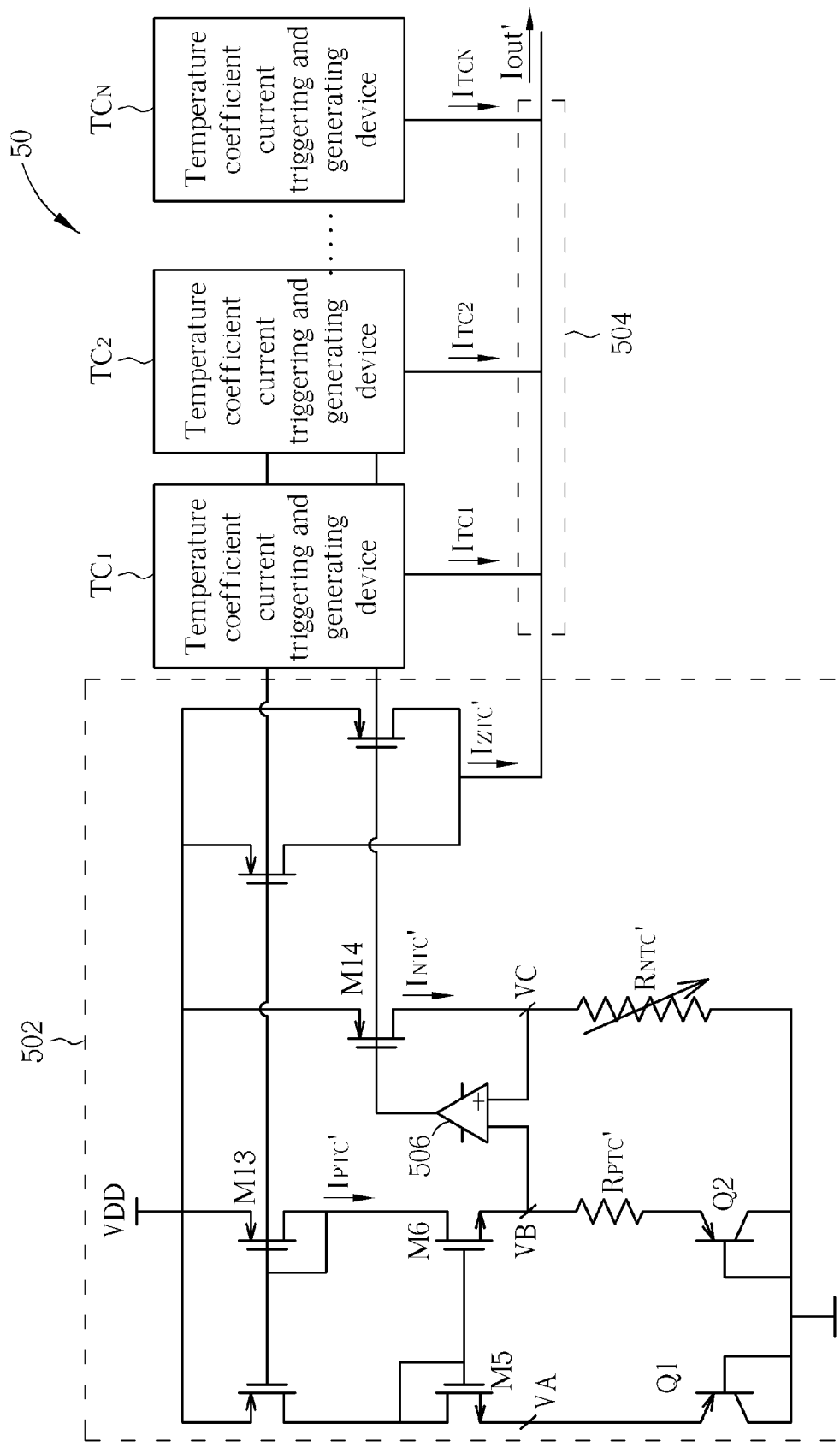
FIG. 5 is a schematic diagram of a temperature coefficient current triggering generating module according to an embodiment of the present invention.

Please refer to FIG. 5, which is a schematic diagram of a temperature coefficient current triggering and generating module 50 according to an embodiment of the present invention. The temperature coefficient current triggering and generating module 50 includes an energy bandgap reference circuit 502, temperature coefficient current triggering and generating devices $TC_1$-$TC_N$ and a summation unit 504. In short, the energy bandgap reference circuit 502 generates a positive temperature coefficient current $I_{PTC}'$, a negative temperature coefficient current $I_{NTC}'$ and a zero temperature coefficient current $I_{ZTC}'$. The temperature coefficient current triggering and generating devices $TC_1$-$TC_N$ generate temperature coefficient currents $I_{TC1}$-$I_{TCN}$, respectively. The summation unit 504 sums the zero temperature coefficient current $I_{ZTC}'$ and the temperature coefficient currents $I_{TC1}$-$I_{TCN}$ to generate a total temperature coefficient current Iout'. Wherein, each of the temperature coefficient current triggering and generating devices $TC_1$-$TC_N$ utilizes current canceling to generate temperature coefficient currents with respective temperature coefficient turning points, respectively. As a result, the temperature coefficient current triggering and generating devices $TC_1$-$TC_N$ generate the smoother temperature coefficient currents $I_{TC1}$-$I_{TCN}$ respectively, and then the summation unit 504 sums the zero temperature coefficient current $I_{ZTC}'$ and the temperature coefficient currents $I_{TC1}$-$I_{TCN}$ to generate the total temperature coefficient current Iout' with multiple and smoother temperature coefficient turning points.

In detail, compared with conventional energy bandgap reference circuit 202, the energy bandgap reference circuit 502 utilizes transistors M5 and M6 to generate the positive temperature coefficient current and utilizes an operational amplifier 506 to generate the negative temperature coefficient current $I_{NTC}'$, which avoids the need of a resistor with resistance L*R to balance the negative temperature coefficient current and reduces layout area effectively. In other words, in the energy bandgap reference circuit 502, since voltages VA and VB are identical, i.e. VA=VB=VEB1, the positive temperature coefficient current $I_{PTC}'$ is generated via a voltage difference between BJTs Q1 and Q2, i.e. VEB1-VEB2, and a resistor $R_{PTC}'$ with resistance of R, as shown in Eq. (1):

$$I'_{PTC} = \frac{VEB1 - VEB2}{R} = \frac{V_T \ln K}{R} \quad (1)$$

wherein K denotes that the BJT Q2 can be considered as K BJTs Q1 connected in parallel. Since a threshold voltage VT is with positive temperature coefficient, by referring to the Eq. (1), the positive temperature coefficient current $I_{PTC}'$ carried by the resistor $R_{PTC}'$ is also with positive temperature coefficient.

On the other hand, since the voltages VA and VB are identical, and the voltage VC at the positive input terminal input of the operational amplifier 506 equals the voltage VB at the negative input terminal input of the operational amplifier 506, the negative temperature coefficient current $I_{NTC}'$ is generated via a voltage difference VEB1 between a base and a emitter of the BJT Q1 and a resistor $R_{NTC}'$ with resistance L*R, as shown in Eq. (2):

$$I'_{NTC} = \frac{VEB1}{L*R} \quad (2)$$

wherein, since the VEB1 is with negative temperature coefficient, the negative temperature coefficient current $I_{NTC}'$ carried by the resistor $R_{NTC}'$ is with negative temperature coefficient. As a result, if the resistance L*R of the resistor $R_{NTC}'$ is properly adjusted, a zero temperature coefficient current $I_{ZTC}'$ is generated via summing the positive temperature coefficient current $I_{PTC}'$ and the negative temperature coefficient current $I_{NTC}'$. As a result, the energy bandgap reference circuit 502 does not need the resistor with resistance L*R to balance the negative temperature coefficient current, which reduces layout area effectively.

Figure 6:
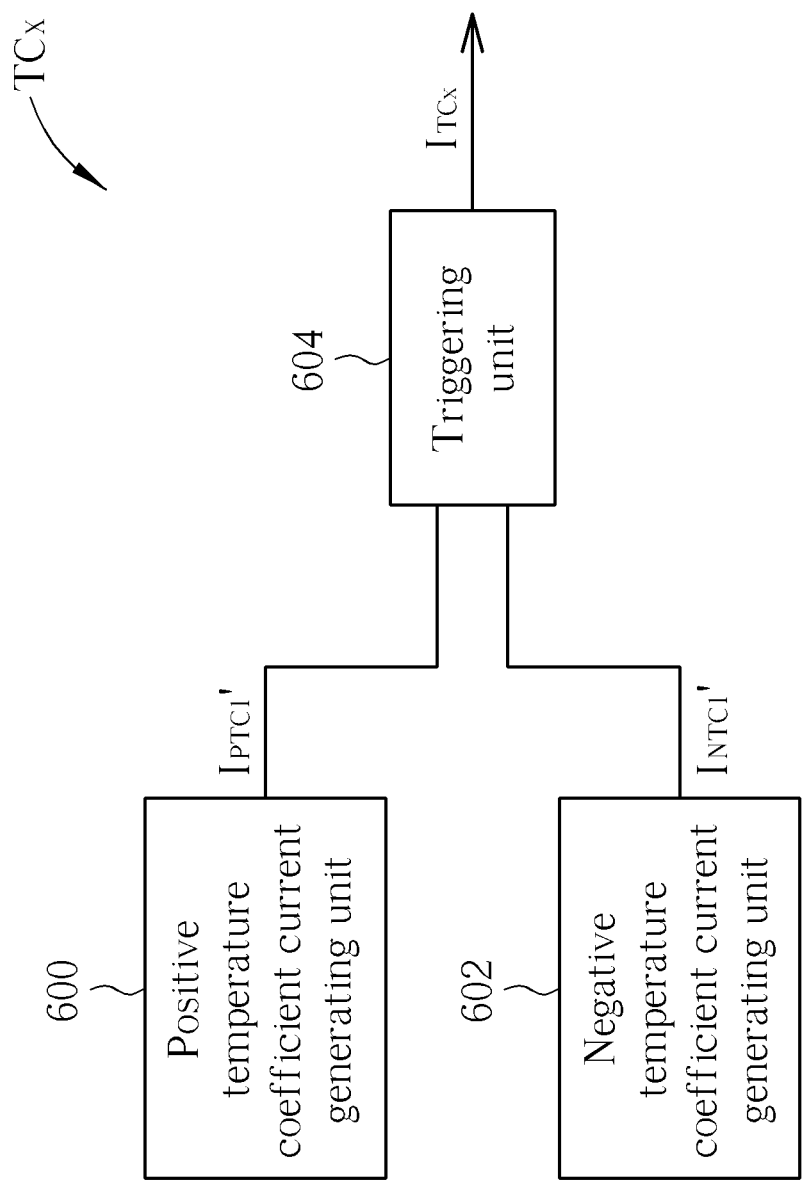
FIG. 6 is a schematic diagram of a temperature coefficient current triggering and generating device shown in FIG. 5.

On the other hand, please refer to FIG. 6, which is a schematic diagram of a temperature coefficient current triggering and generating device $TC_x$ of the temperature coefficient current triggering and generating devices TC1-$TC_N$ shown in FIG. 5. As shown in FIG. 6, the temperature coefficient current triggering and generating device $TC_x$ includes a positive temperature coefficient current generating unit 600, a negative temperature coefficient current generating unit 602 and a triggering unit 604. In short, the positive temperature coefficient current generating unit 600 generates a positive temperature coefficient current $I_{PTC1}'$, the negative temperature coefficient current generating unit 602 generates a negative temperature coefficient current $I_{NTC1}'$, the triggering unit 604 triggers to generate a temperature coefficient current $I_{TCx}$ according to a triggering temperature $T_x$ and a current difference between the positive temperature coefficient current $I_{PTC1}'$ and the negative temperature coefficient current $I_{NTC1}'$. As a result, the temperature coefficient current triggering and generating device $TC_x$ utilizes current canceling to generate the temperature coefficient current $I_{TCx}$ with temperature coefficient turning point at the triggering temperature $T_x$.

In detail, the temperature coefficient current triggering and generating device $TC_x$ is designed to make the positive temperature coefficient current $I_{PTC1}'$ equal to the negative temperature coefficient current $I_{NTC1}'$ when an environment temperature equals the triggering temperature $T_x$. In such a situation, when the environment temperature is less than the triggering temperature Tx, the negative temperature coefficient current $I_{NTC1}'$ is greater than the positive temperature coefficient current $I_{PTC1}'$, so that the triggering unit 604 triggers to generate the temperature coefficient current $I_{TCx}$ with negative temperature coefficient. Or, when the environment temperature is greater than triggering temperature Tx, the positive temperature coefficient current $I_{PTC1}'$ is greater than the negative temperature coefficient current $I_{NTC1}'$, so that the triggering unit 604 triggers to generate the temperature coefficient current $I_{TCx}$ with positive temperature coefficient. Wherein, the temperature coefficient current $I_{TCx}$ can be a positive current or a negative current, which means the triggering unit 604 can trigger to output the temperature coefficient current $I_{TCx}$, or drain the temperature coefficient current $I_{TCx}$.

For example, please refer to FIG. 7A to FIG. 7D, which are schematic diagrams of four types $TCT_1$-$TCT_4$ of the temperature coefficient current triggering and generating device $TC_x$ shown in FIG. 6 according to alterations of the present invention. The type $TCT_1$ outputs the temperature coefficient current $I_{TCx}$ with negative temperature coefficient, the type $TCT_2$ drains the temperature coefficient current $I_{TCx}$ with positive temperature coefficient, the type $TCT_3$ outputs the temperature coefficient current $I_{TCx}$ with positive temperature coefficient, the type $TCT_4$ drains the temperature coefficient current $I_{TCx}$ with negative temperature coefficient, and the temperature coefficient current $I_{TCx}$ can be denoted as follows:

$$I_{TCx} = \begin{cases} 0, & I1 \leq I2 \\ sgn \cdot K \cdot (I1 - I2), & I1 > I2 \end{cases} \quad (3)$$

wherein each of currents I1 and I2 represents one of the positive temperature coefficient current $I_{PTC1}'$ and the negative temperature coefficient current $I_{NTC1}'$ in the types $TCT_1$-$TCT_4$. sgn is 1 when the triggering unit 604 triggers to output the temperature coefficient current $I_{TCx}$, while sgn is −1 when the triggering unit 604 triggers to drain temperature coefficient current $I_{TCx}$. Please refer to following description for details.

Figure 7A:
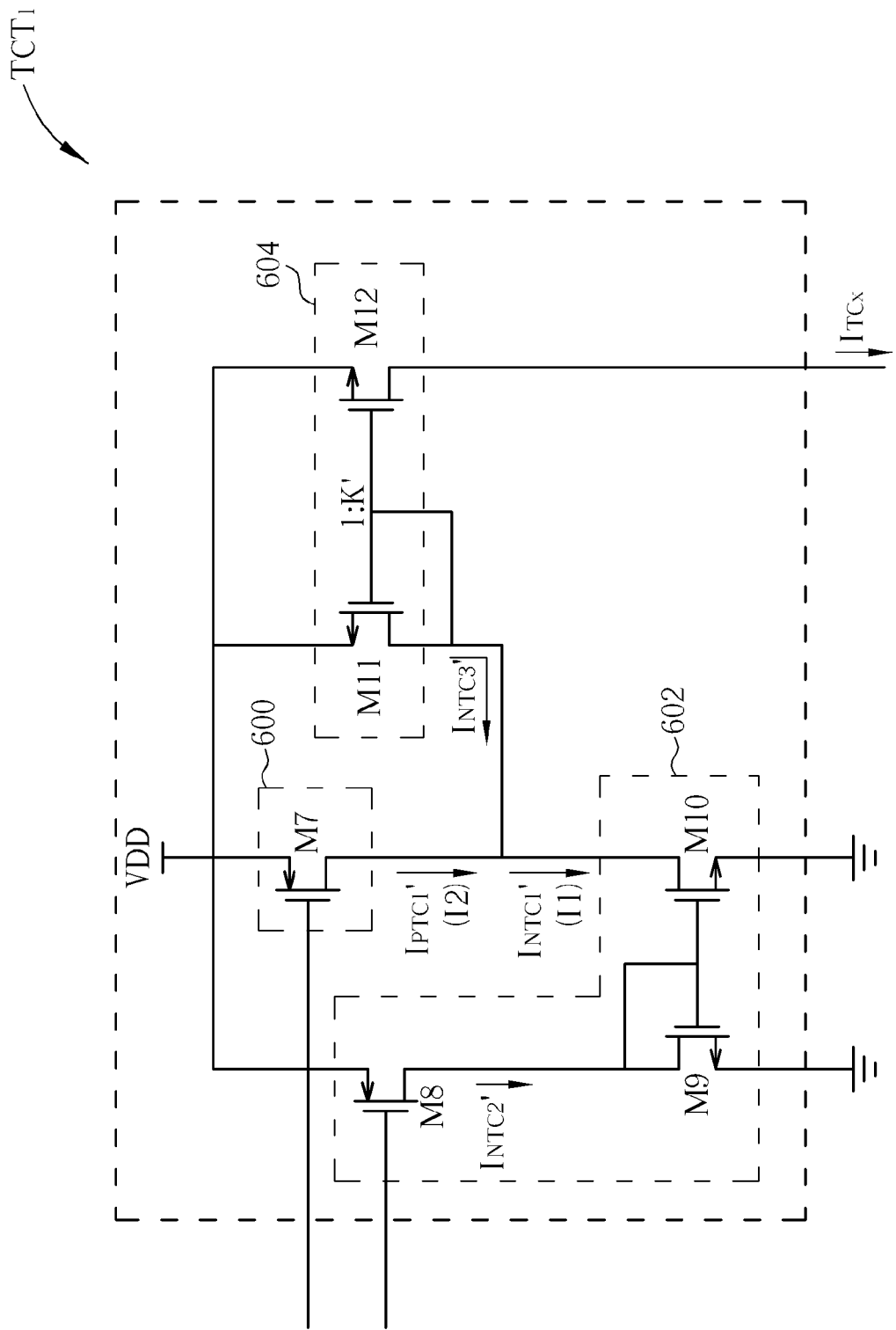
FIG. 7A to FIG. 7D are schematic diagrams of four types of the temperature coefficient current triggering and generating device shown in FIG. 6 according to alternative embodiments of the present invention.

As shown in FIG. 7A, the positive temperature coefficient current generating unit 600 includes a transistor M7 of a current mirror, the negative temperature coefficient current generating unit 602 includes a transistor M8 and a current mirror including transistors M9 and M10, while the triggering unit 604 includes transistors M11 and M12, wherein detailed structure and connecting method are shown in FIG. 7A. That is, a gate of the transistor M7 is coupled to a gate of a transistor M13 of the current mirror shown in FIG. 5; a gate of the transistor M8 is coupled to a gate of a transistor M14 of the current mirror shown in FIG. 5; a gate of the transistor M9 is coupled to a drain of the transistor M9, and the drain of the transistor M9 is coupled to a drain of the transistor M8; a gate of the transistor M10 is coupled to the gate of the transistor M9, a drain of the transistor M10 is coupled to a drain of the transistor M7; a gate of the transistor M11 is coupled to a drain of the transistor M11, and the drain of the transistor M11 is coupled between the drain of the transistor M7 and the drain of the transistor M10; a gate of the transistor M12 is coupled to the gate of the transistor M11, wherein a size of the transistor M12 is K' times that of the transistor M11. The transistors M7, M8, M11 and M12 are P-type metal oxide semiconductor (PMOS) transistors, and the transistors M9 and M10 are NMOS transistors.

In such a situation, in the positive temperature coefficient current generating unit 600, the transistor M7 generates the positive temperature coefficient current $I_{PTC1}'$ according to the positive temperature coefficient current $I_{PTC}'$ outputted by the transistor M13, i.e. the current I2 in the Eq. (2). In the negative temperature coefficient current generating unit 602, the transistor M8 generates a negative temperature coefficient current $I_{NTC2}'$ according to a negative temperature coefficient current $I_{NTC}'$ outputted by the transistor M14, the transistor M9 receives the negative temperature coefficient current $I_{NTC2}'$ at its drain, and the transistor M10 drains the negative temperature coefficient current $I_{NTC1}'$ at its drain according to the negative temperature coefficient current $I_{NTC2}'$ received by the transistor M9, i.e. the current I1 in the Eq. (3).

Noticeably, the type $TCT_1$, i.e. the temperature coefficient current triggering and generating device $TC_x$, is designed to make the positive temperature coefficient current $I_{PTC1}'$ equal to the negative temperature coefficient current $I_{NTC1}'$ when the environment temperature equals the triggering temperature $T_x$. In such a situation, In the triggering unit 604, when the environment temperature is less than the triggering temperature Tx, the negative temperature coefficient current $I_{NTC1}'$ is greater than the positive temperature coefficient current $I_{PTC1}'$, so that the transistor M11 outputs a negative temperature coefficient current $I_{NTC3}'$ equaled subtracting the positive temperature coefficient current $I_{PTC1}'$ from the negative temperature coefficient current $I_{NTC1}'$. The transistor M12 outputs the temperature coefficient current $I_{TCx}$ with negative temperature coefficient at a drain according to the negative temperature coefficient current $I_{NTC3}'$ outputted by the transistor M11, wherein the temperature coefficient current $I_{TCx}$ is K times the negative temperature coefficient current $I_{NTC3}'$. Oppositely, the positive temperature coefficient current $I_{PTC1}'$ should be greater than the negative temperature coefficient current $I_{NTC1}'$ when the environment temperature is greater than triggering temperature $T_x$, but a conductivity of the transistor M7 is stronger than that of the transistor M10, such that the positive temperature coefficient current $I_{PTC1}'$ equals the negative temperature coefficient current $I_{NTC1}'$, and thus the transistor M11 does not output current when the environment temperature is greater than the triggering temperature $T_{trigger}'$, which results in the temperature coefficient current $I_{TCx}$ being 0. As a result, the type $TCT_1$ outputs the temperature coefficient current $I_{TCx}$ with negative temperature coefficient when the environment temperature is less than the triggering temperature $T_{trigger}'$, but does not output current when the environment temperature is greater than the triggering temperature $T_{trigger}'$. And due to an analog operation that utilizes the current mirror to perform current canceling between the positive temperature coefficient current $I_{PTC1}'$ and the negative temperature coefficient current $I_{NTC1}'$, the temperature coefficient current $I_{TCx}$ is smoother around the triggering temperature $T_{trigger}'$ and the structure of the circuit is simpler compared with a conventional comparator.

Figure 7B:
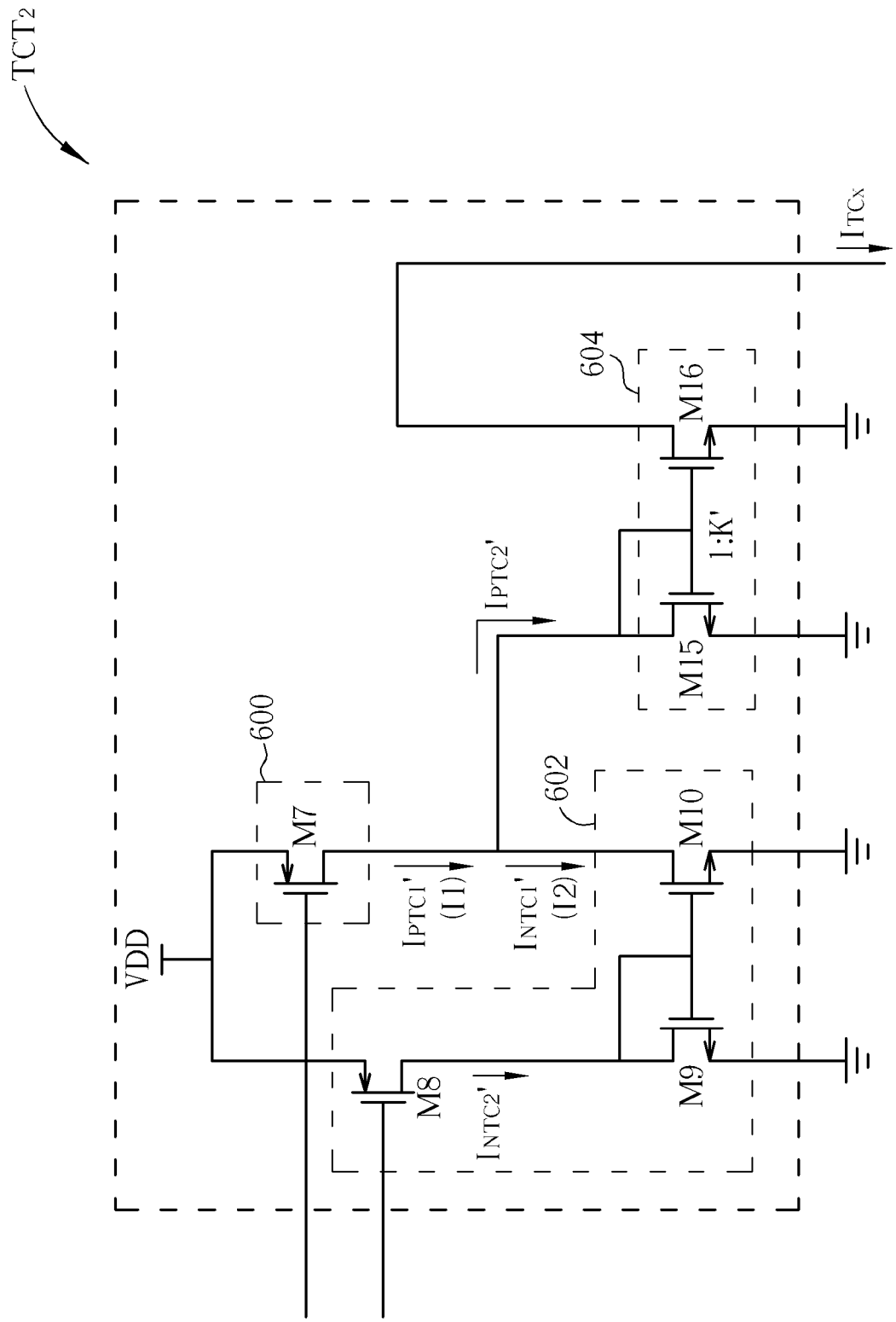

Similarly, please refer to FIG. 7B, the type $TCT_2$ is substantially similar to the type $TCT_1$, and thus elements with similar structure are denoted by same symbols, and the related operations can be referred to the above description. Difference between the type $TCT_2$ and the type $TCT_1$ is that the transistors M15 and M16 of the triggering unit 604 are NMOS transistors, which are utilized for triggering to drain the temperature coefficient current $I_{TCx}$, i.e. the negative current, and thus the positive temperature coefficient current $I_{PTC1}'$ represents the current I1 in the Eq. (3), and the negative temperature coefficient current $I_{NTC1}'$ represents the current I2 in the Eq. (3).

The type $TCT_2$, i.e. the temperature coefficient current triggering and generating device $TC_x$, is also designed to make the positive temperature coefficient current $I_{PTC1}'$ equal to the negative temperature coefficient current $I_{NTC1}'$ when the environment temperature equals the triggering temperature $T_x$. In such a situation, in the triggering unit 604, when the environment temperature is greater than triggering temperature Tx, the positive temperature coefficient current $I_{PTC1}'$ is greater than the negative temperature coefficient current $I_{NTC1}'$ so that the transistor M15 drains a positive temperature coefficient current $I_{PTC2}'$ equaled subtracting the negative temperature coefficient current $I_{NTC1}'$ from the positive temperature coefficient current $I_{PTC1}'$. The transistor M16 drains the temperature coefficient current $I_{TCx}$ with positive temperature coefficient at a drain according to the positive temperature coefficient current $I_{PTC2}'$ drained by the transistor M15, wherein the temperature coefficient current $I_{TCx}$ is a negative current K times the positive temperature coefficient current $I_{PTC2}'$. Oppositely, the transistor M15 does not drain current when the environment temperature is less than triggering temperature $T_{trigger}'$, such that the temperature coefficient current $I_{TCx}$ is 0. As a result, the type $TCT_2$ drains the temperature coefficient current $I_{TCx}$ with positive temperature coefficient when the environment temperature is greater than the triggering temperature $T_{trigger}'$, but does not drain current when the environment temperature is less than the triggering temperature $T_{trigger}'$. And due to an analog operation that utilizes the current mirror to perform current canceling between the positive temperature coefficient current $I_{PTC1}'$ and the negative temperature coefficient current $I_{NTC1}'$, the temperature coefficient current $I_{TCx}$ is smoother around the triggering temperature $T_{trigger}'$ and the structure of the circuit is simpler compared with a conventional comparator.

Figure 7C:
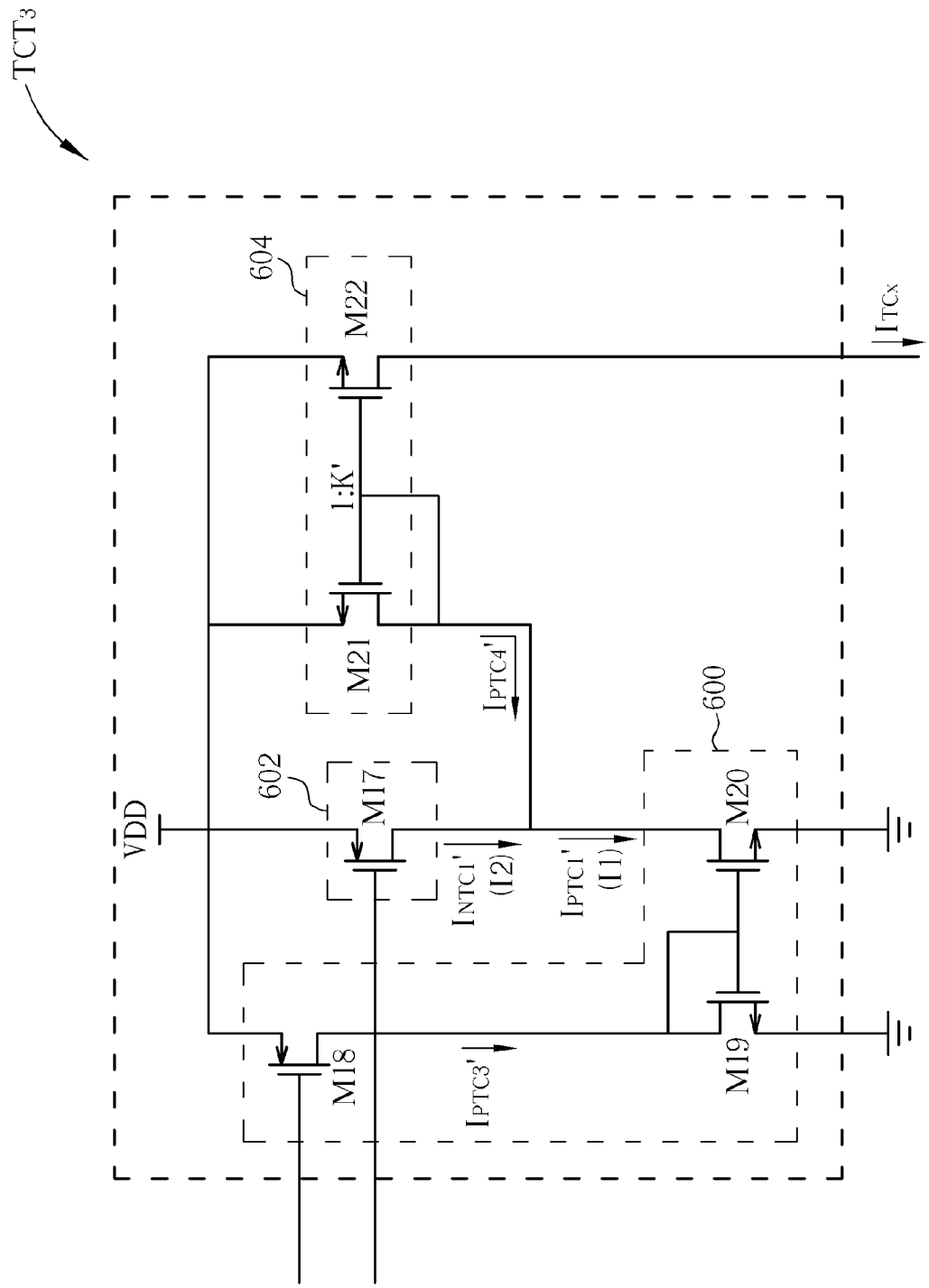

On the other hand, as shown in FIG. 7C, the negative temperature coefficient current generating unit 602 includes a transistor M17 of a current mirror, the positive temperature coefficient current generating unit 600 includes a transistor M18 and a current mirror including transistors M19 and M20, while the triggering unit 604 includes transistors M21 and M22, wherein detailed structure and connecting method are shown in FIG. 7C. That is, a gate of the transistor M17 is coupled to the gate of the transistor M14 of the current mirror shown in FIG. 5; a gate of the transistor M18 is coupled to the gate of the transistor M13 of the current mirror shown in FIG. 5; a gate of the transistor M19 is coupled to a drain of the transistor M19, the drain of the transistor M19 is coupled to a drain of the transistor M18; a gate of the transistor M20 is coupled to the gate of the transistor M19, a drain of the transistor M20 is coupled to a drain of the transistor M17; a gate of the transistor M21 is coupled to a drain of the transistor M21, the drain of the transistor M21 is coupled between the drain of the transistor M17 and the drain of the transistor M20; a gate of the transistor M22 is coupled to the gate of the transistor M11, wherein a size of the transistor M22 is K' times that of the transistor M21. The transistors M17, M18, M21 and M22 are PMOS transistors, and the transistors M19 and M20 are NMOS transistors.

In such a situation, in the negative temperature coefficient current generating unit 602, the transistor M17 generates the negative temperature coefficient current $I_{NTC1}'$, according to the negative temperature coefficient current $I_{NTC}'$ outputted by the transistor M14, i.e. the current I2 in the Eq. (3). In the positive temperature coefficient current generating unit 600, the transistor M18 generates a positive temperature coefficient current $I_{PTC3}'$ according to a positive temperature coefficient current $I_{PTC}'$ outputted by the transistor M13, the transistor M19 receives the positive temperature coefficient current $I_{PTC3}'$ at its drain, and the transistor M20 drains the positive temperature coefficient current $I_{PTC1}'$ at its drain according to the positive temperature coefficient current $I_{PTC3}'$ received by the transistor M19, i.e. the current I1 in the Eq. (3).

Noticeably, the type $TCT_3$, i.e. the temperature coefficient current triggering and generating device $TC_x$, is designed to make the positive temperature coefficient current $I_{PTC1}'$ equal to the negative temperature coefficient current $I_{NTC1}'$ when the environment temperature equals the triggering temperature $T_x$. In such a situation, in the triggering unit 604, when the environment temperature is greater than the triggering temperature $T_x$, the positive temperature coefficient current $I_{PTC1}'$ is greater than the negative temperature coefficient current $I_{NTC1}'$ so that the transistor M21 outputs a positive temperature coefficient current $I_{PTC4}'$ equaled subtracting the negative temperature coefficient current $I_{NTC1}'$ from the positive temperature coefficient current $I_{PTC1}'$. The transistor M22 outputs the temperature coefficient current $I_{TCx}$ with positive temperature coefficient at a drain according to the positive temperature coefficient current $I_{PTC4}'$ outputted by the transistor M21, wherein the temperature coefficient current $I_{TCx}$ is K times the positive temperature coefficient current $I_{PTC4}'$. Oppositely, the negative temperature coefficient current $I_{NTC1}'$ should be greater than the positive temperature coefficient current $I_{PTC1}'$ when the environment temperature is less than the triggering temperature $T_{trigger}'$, but a conductivity of the transistor M17 is stronger than that of the transistor M20, such that the negative temperature coefficient current $I_{NTC1}'$ equals the positive temperature coefficient current $I_{PTC1}'$, and thus the transistor M21 does not output current when the environment temperature is less than the triggering temperature $T_{trigger}'$, which makes the temperature coefficient current $I_{TCx}$ being 0. As a result, the type $TCT_3$ outputs the temperature coefficient current $I_{TCx}$ with positive temperature coefficient when the environment temperature is greater than the triggering temperature $T_{trigger}'$, but does not output current when the environment temperature is less than the triggering temperature $T_{trigger}'$. And due to an analog operation that utilizes the current mirror to perform current canceling between the positive temperature coefficient current $I_{PTC1}'$ and the negative temperature coefficient current $I_{NTC1}'$, the temperature coefficient current $I_{TCx}$ is smoother around the triggering temperature $T_{trigger}'$ and the structure of the circuit is simpler compared with a conventional comparator.

Figure 7D:
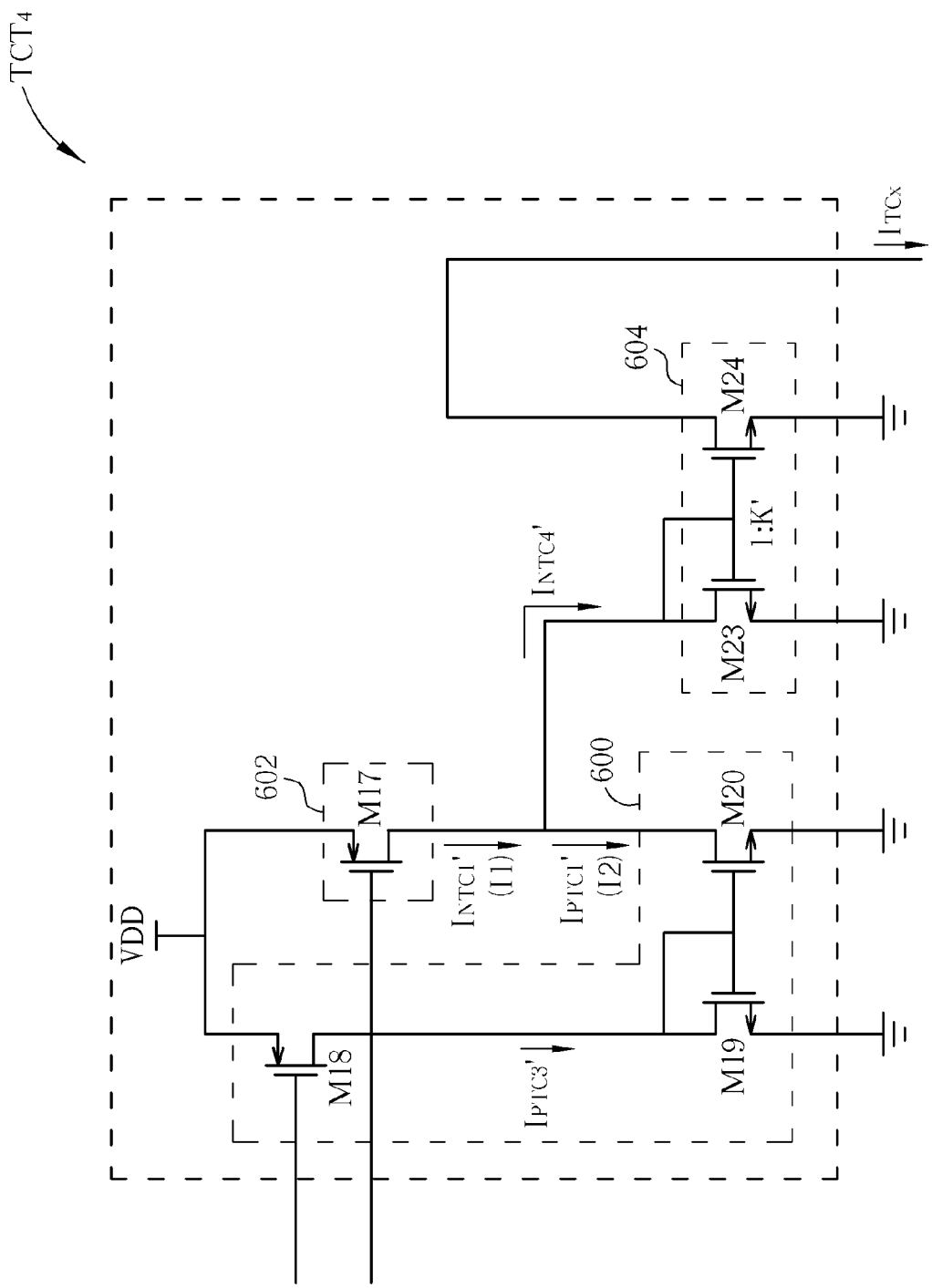

Similarly, please refer to FIG. 7D, the type $TCT_4$ is substantially similar to the type $TCT_3$, and thus elements with similar structure are denoted with same symbols, and the related operations can be referred to the above description. Difference between the $TCT_4$ and the type $TCT_3$ is that the transistors M23 and M24 of the triggering unit 604 are NMOS transistors, for triggering to drain the temperature coefficient current $I_{TCx}$, i.e. negative current, and thus the negative temperature coefficient current $I_{NTC1}'$ represents the current I1 in the Eq. (3), and the positive temperature coefficient current $I_{PTC1}'$ represents the current I2 in the Eq. (3).

The type $TCT_4$, i.e. the temperature coefficient current triggering and generating device $TC_x$, is designed to make the positive temperature coefficient current $I_{PTC1}'$ equal to the negative temperature coefficient current $I_{NTC1}'$ when the environment temperature equals the triggering temperature $T_x$. In such a situation, in the triggering unit 604, when the environment temperature is less than the triggering temperature Tx, the negative temperature coefficient current $I_{NTC1}'$ is greater than the positive temperature coefficient current $I_{PTC1}'$ so that the transistor M23 drains a negative temperature coefficient current $I_{NTC4}'$ equaled subtracting the positive temperature coefficient current $I_{PTC1}'$ from the negative temperature coefficient current $I_{NTC1}'$. The transistor M24 drains the temperature coefficient current $I_{TCx}$ with negative temperature coefficient at a drain according to the negative temperature coefficient current $I_{NTC4}'$ drained by the transistor M23, wherein the temperature coefficient current $I_{TCx}$ is a negative current K times the negative temperature coefficient current $I_{NTC4}'$. Oppositely, the transistor M23 does not drain current when the environment temperature is greater than the triggering temperature $T_{trigger}'$, such that the temperature coefficient current $I_{TCx}$ is 0. As a result, the type $TCT_4$ drains the temperature coefficient current $I_{TCx}$ with negative temperature coefficient when the environment temperature is less than the triggering temperature $T_{trigger}'$, but does not drain current when the environment temperature is greater than the triggering temperature $T_{trigger}'$. And due to an analog operation that utilizes the current mirror to perform current canceling between the positive temperature coefficient current $I_{PTC1}'$ and the negative temperature coefficient current $I_{NTC1}'$ the temperature coefficient current $I_{TCx}$ is smoother around the triggering temperature $T_{trigger}'$ and the structure of the circuit is simpler compared with a conventional comparator.

Noticeably, the spirit of the present invention is that each temperature coefficient current triggering and generating device utilizes current mirrors to perform current canceling between the positive temperature coefficient current and the negative temperature coefficient current, even between the zero temperature coefficient current, e.g. the method of generating the $I_{ZTC}'$ shown in FIG. 5, and the positive temperature coefficient current or the negative temperature coefficient current, to generate temperature coefficient current in one side of the temperature coefficient turning point while no current in another side of the temperature coefficient turning point, such that the temperature coefficient current is smoother around the triggering temperature, and the circuit is simpler without the comparator. The present invention further generates the smoother total temperature coefficient current with multiple temperature coefficient turning points via summing multiple temperature coefficient currents generated by multiple temperature coefficient current triggering and generating devices. Those skilled in the art should make modifications accordingly, and not limited to this. For example, the energy bandgap reference circuit 502 is used for generating the positive temperature coefficient current $I_{PTC}'$, the negative temperature coefficient current $I_{NTC1}'$ and the zero temperature coefficient current $I_{ZTC}'$, which is not limited to the structure of the present invention; the positive temperature coefficient current generating unit 600 and the negative temperature coefficient current generating unit 602 of each temperature coefficient current triggering and generating device are used for generating the positive temperature coefficient current $I_{PTC1}'$ (or zero temperature coefficient current) and the negative temperature coefficient current $I_{NTC1}'$ (or zero temperature coefficient current), such that the triggering unit 604 utilizes current canceling to generate the smoother temperature coefficient current $I_{TCx}$, which is not limited to utilizing current mirror of the present invention.

Figure 7E:
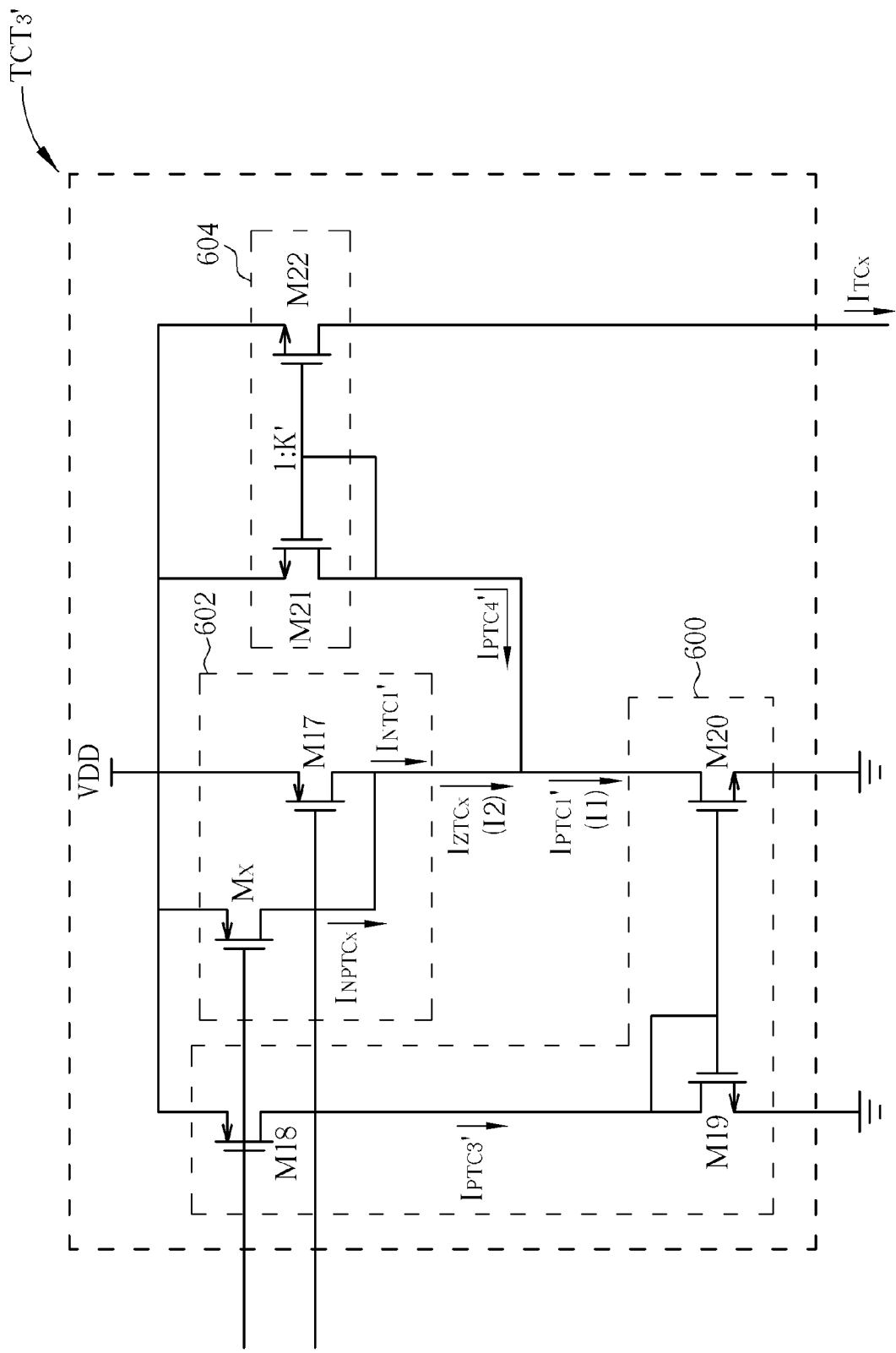
FIG. 7E is a schematic diagram of a type according to an alternative embodiment of the type shown in FIG. 7C.

Although all the above embodiments of FIG. 7A to FIG. 7D generate temperature coefficient current via current canceling between the positive temperature coefficient current and the negative temperature coefficient current, the present invention may also generate the temperature coefficient current via current canceling between the positive temperature coefficient current and the zero temperature coefficient current, or current canceling between the negative temperature coefficient current and the zero temperature coefficient current. For example, please refer to FIG. 7E, which is a schematic diagram of a type $TCT_3'$ according to an alteration of the embodiment of the type $TCT_3$ shown in FIG. 7C. The type $TCT_3'$ shown in FIG. 7E and the type $TCT_3$ shown in FIG. 7C are substantially similar, the difference is that the negative temperature coefficient current generating unit 602 of the type $TCT_3'$ shown in FIG. 7C further includes a transistor Mx as the zero temperature coefficient current generating unit, a gate of the transistor Mx is also coupled to the gate of the transistor M13 shown in FIG. 5, for generating a positive temperature coefficient current $I_{PTCx}'$ according to the positive temperature coefficient current $I_{PTC}'$ outputted by the transistor M13, which is further used to be summed with the negative temperature coefficient current $I_{NTC1}'$ generated by the transistor M17, to generate a zero temperature coefficient current $I_{ZTCx}'$, i.e. the current I2 in Eq. (3). In other words, compared with the type $TCT_3$ generating the temperature coefficient current $I_{TCx}$ with positive temperature coefficient via subtracting the negative temperature coefficient current $I_{NTC1}'$ from the positive temperature coefficient current $I_{PTC1}'$, the type $TCT_3'$ generates the temperature coefficient current $I_{TCx}$ with positive temperature coefficient via subtracting the zero temperature coefficient current $I_{ZTCx}'$ from the positive temperature coefficient current $I_{PTC1}'$. As a result, compared with the design of making the positive temperature coefficient current and the negative temperature coefficient current equal at the triggering temperature $T_{trigger}'$, the zero temperature coefficient current is constant with temperature, and thus the circuit design is simpler.

Likewise, it is suitable to add one transistor in the positive temperature coefficient current generating unit 600 of the type $TCT_1$ shown in FIG. 7A, the positive temperature coefficient current generating unit 602 of the type $TCT_2$ shown in FIG. 7B and the positive temperature coefficient current generating unit 600 of the type $TCT_4$ shown in FIG. 7D, respectively, as the zero temperature coefficient current, so as to generate the temperature coefficient current $I_{TCx}$ via canceling the positive temperature coefficient current or the negative temperature coefficient current.

Figure 8:
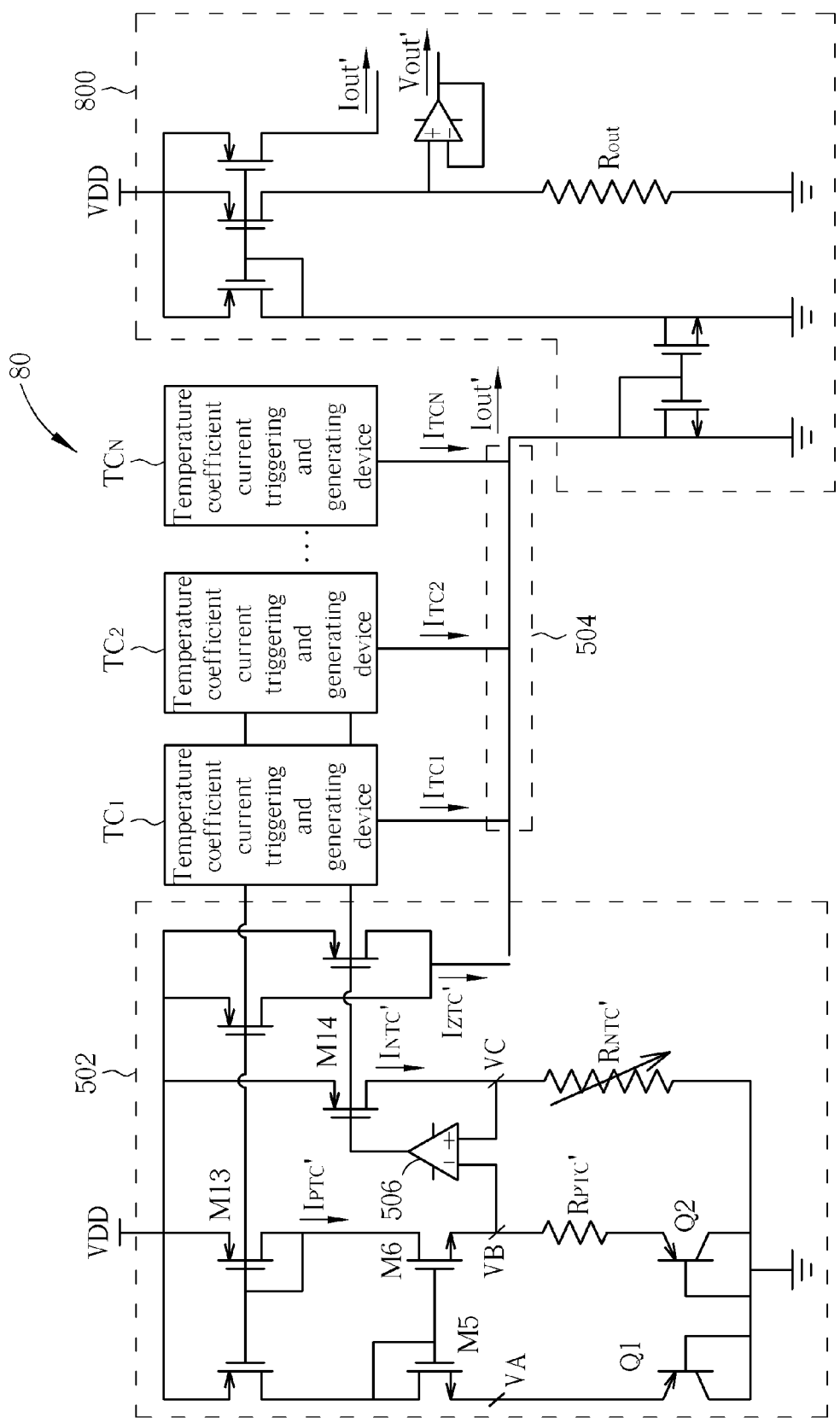
FIG. 8 is a schematic diagram of the temperature coefficient current triggering generating module shown in FIG. 5 according to an alternative embodiment of the present invention.

Besides, the temperature coefficient current triggering and generating module 50 of the present invention can be applied in any circuit utilizing a reference current source, e.g. a current source converted by a current-voltage converter, or another circuit converts current source into analog or digital signal, and not limited to the energy bandgap reference circuit. For example, please refer to FIG. 8, which is a schematic diagram of the temperature coefficient current triggering and generating module 50 shown in FIG. 5 according to an alteration of the present invention. As shown in FIG. 8, the temperature coefficient current triggering and generating module 50 further includes an output unit 800. The output unit 800 utilizes a current mirror to duplicate the total temperature coefficient current Iout', so as to generate the total temperature coefficient current Iout' at a current output terminal directly, and pass the duplicated total temperature coefficient current Iout' through a resistor Rout or other impedance elements, for generating a total temperature coefficient voltage Vout' at a current output terminal. Noticeably, in other embodiment, the output unit 800 can be used in only one temperature coefficient current triggering device. Besides, the output unit 800 may only pass the total temperature coefficient current Iout' through the resistor Rout or other impedance elements to generate the total temperature coefficient voltage Vout', and is not limited that the output unit 800 generates the total temperature coefficient current Iout' and the total temperature coefficient voltage Vout' simultaneously shown in FIG. 8.

In addition, the size ratios of the types $TCT_1$-$TCT_4$ are all K', but the size ratios is adjustable according to practical requirement. A number of the temperature coefficient current triggering and generating devices $TC_1$-$TC_N$ may include the temperature coefficient current triggering and generating devices among the different types $TCT_1$-$TCT_4$. The temperature coefficient current triggering and generating devices $TC_1$-$TC_N$ may have different triggering temperatures $T_{trigger}'$, to design the temperature coefficient of the total temperature coefficient current Iout' according to practical requirement, so as to compensate the temperature effect due to non-ideal factors of different circuits.

Figure 9A:
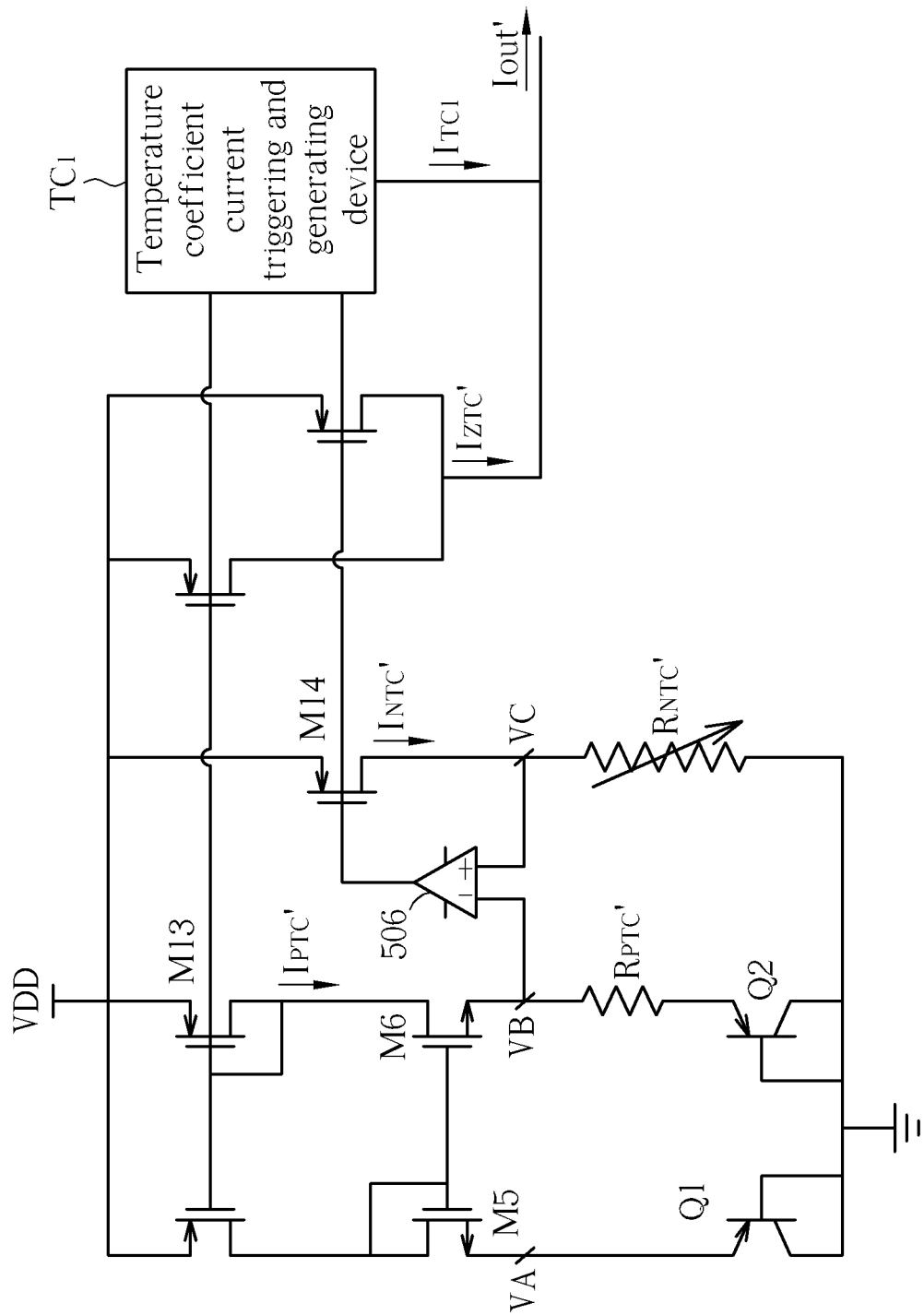
FIG. 9A is a schematic diagram of the temperature coefficient current triggering and generating module 50 shown in FIG. 5 with selective temperature coefficient current triggering and generating device according to an embodiment of the present invention.
Figure 9B:
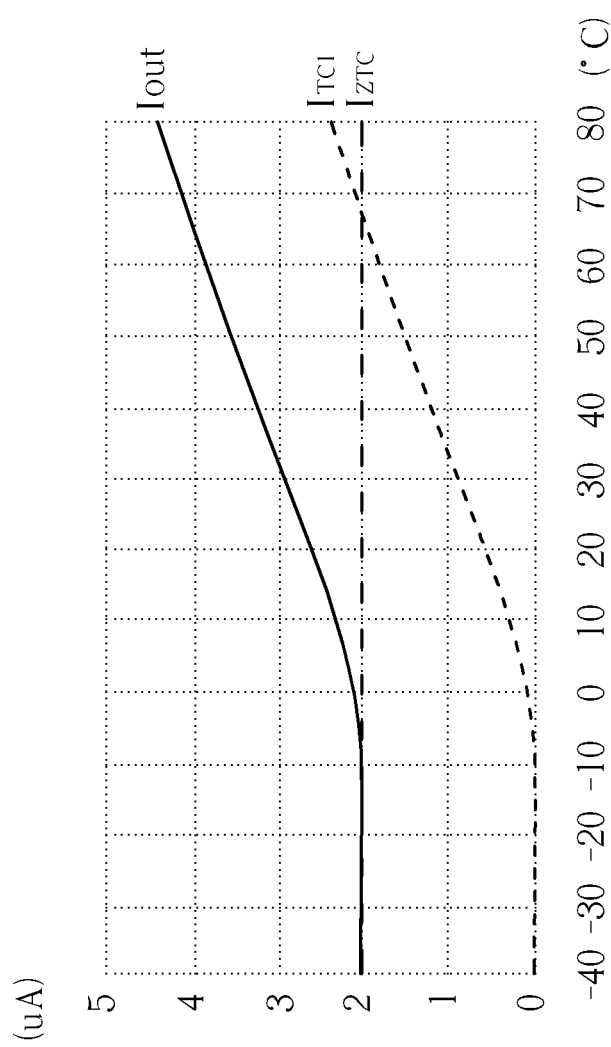
FIG. 9B is a schematic diagram of the total temperature coefficient current, the zero temperature coefficient current and the temperature coefficient current shown in FIG. 9A.

For example, please refer to FIG. 9A and FIG. 9B. FIG. 9A is a schematic diagram of the temperature coefficient current triggering and generating module 50 shown in FIG. 5 with selective temperature coefficient current triggering and generating device $TC_1$ according to an embodiment of the present invention. FIG. 9B is a schematic diagram of the total temperature coefficient current Iout', the zero temperature coefficient current $I_{ZTC}'$ and the temperature coefficient current $I_{TC1}$ shown in FIG. 9A, wherein the temperature coefficient current triggering and generating device $TC_1$ belongs to the type $TCT_3$, the size ratio K' is 2.5, and the triggering temperature $T_{trigger}'$ is −10° C. As shown in FIG. 9B, since the type $TCT_3$ generates temperature coefficient current $I_{TC1}$ via current canceling, the type $TCT_3$ outputs the temperature coefficient current $I_{TC1}$ with positive temperature coefficient when the environment temperature is greater than −10° C., but does not output current when the environment temperature is less than −10° C. Therefore, the total temperature coefficient current Iout' generated by summing the zero temperature coefficient current $I_{ZTC}'$ is smoother than the temperature coefficient current generated by the conventional digital switching.

Figure 10A:
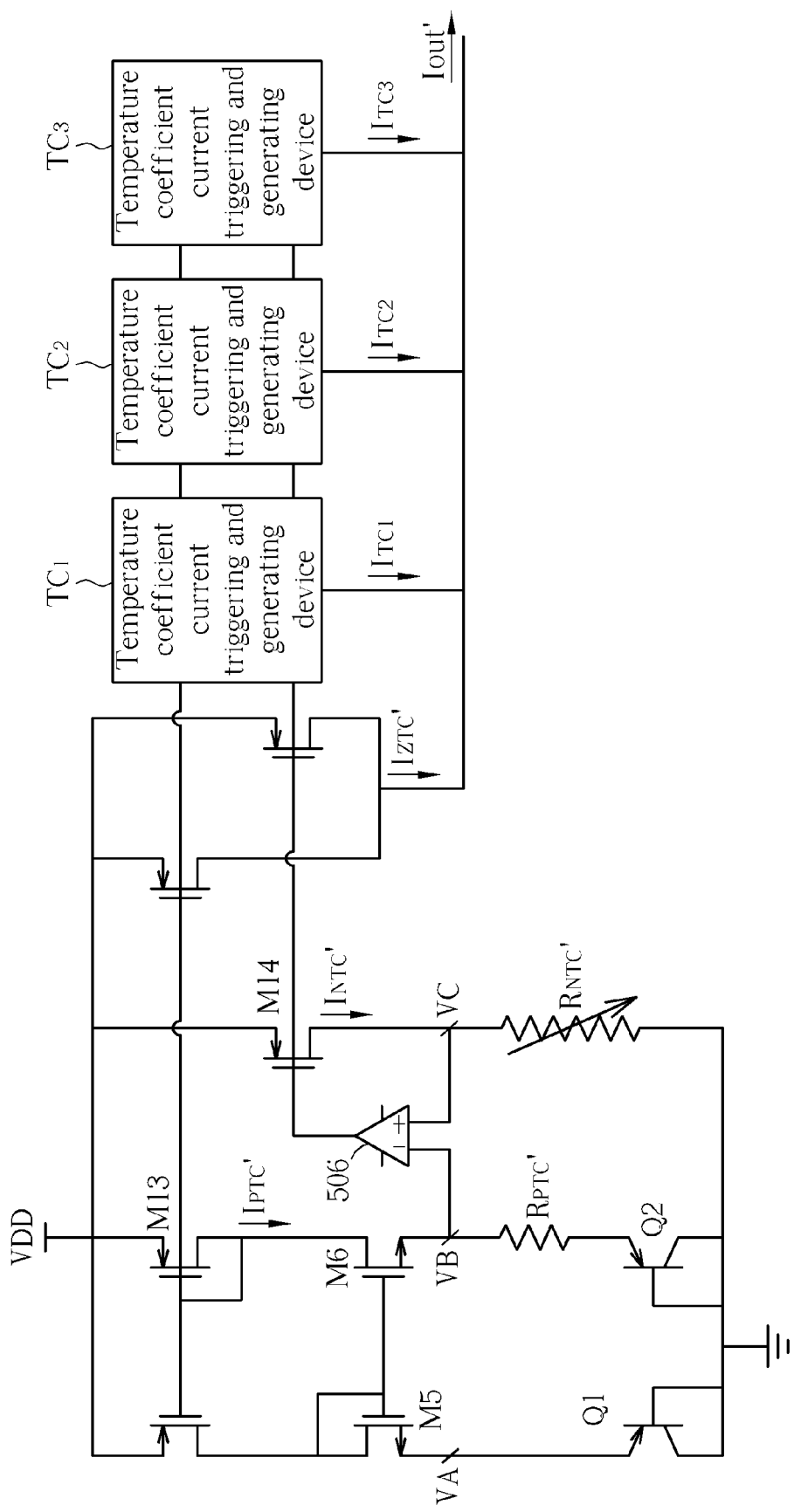
FIG. 10A is a schematic diagram of the temperature coefficient current triggering generating module selectively including 3 temperature coefficient current triggering and generating devices shown in FIG. 5 according to alternative embodiment of the present invention.
Figure 10B:
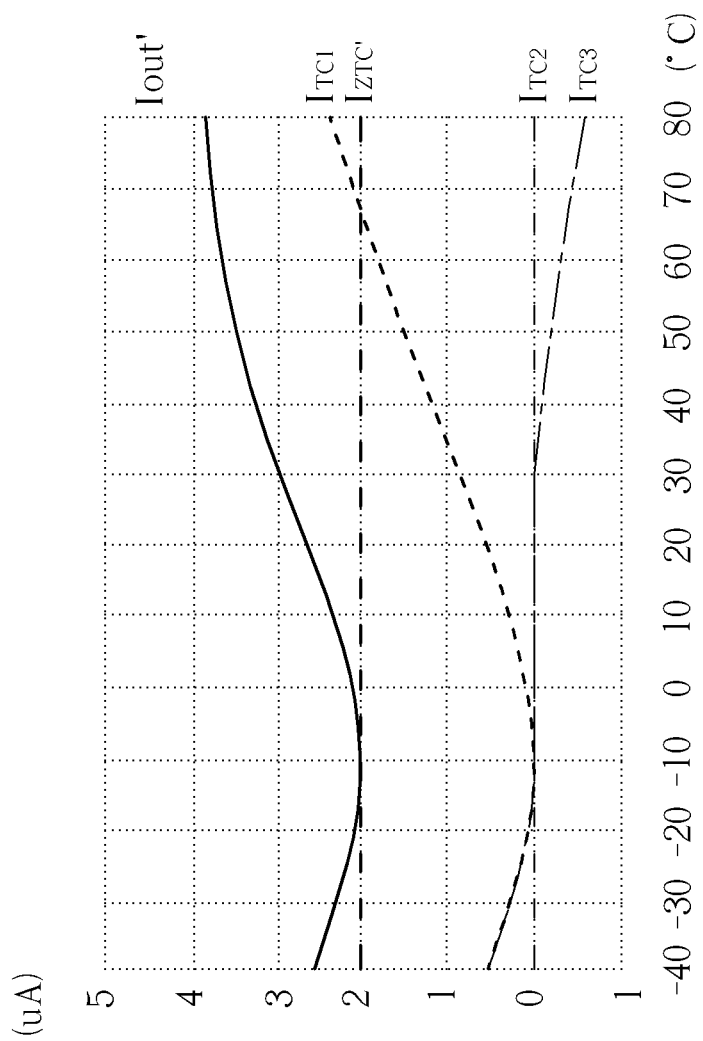
FIG. 10B is a schematic diagram of the total temperature coefficient current, the zero temperature coefficient current and the temperature coefficient currents shown in FIG. 10A.

On the other hand, please refer to FIG. 10A and FIG. 10B. FIG. 10A is a schematic diagram of the temperature coefficient current triggering and generating module 50 selectively including 3 temperature coefficient current triggering and generating devices $TC_1$-$TC_3$ shown in FIG. 5 according to alteration of the present invention. FIG. 10B is a schematic diagram of the total temperature coefficient current Iout', the zero temperature coefficient current $I_{ZTC}'$ and the temperature coefficient currents $I_{TC1}$-$I_{TC3}$ shown in FIG. 10A, wherein the temperature coefficient current triggering and generating device $TC_1$ is the type $TCT_3$, the size ratio K' is 2.5 and the triggering temperature $T_{trigger}$' is −10° C.; the temperature coefficient current triggering and generating device $TC_2$ is the type $TCT_1$, the size ratio K' is 1.5 and the triggering temperature $T_{trigger}$' is −30° C.; the temperature coefficient current triggering and generating device $TC_3$ is the type $TCT_2$, the size ratio K' is 1.5 and the triggering temperature $T_{trigger}$' is 50° C. As shown in FIG. 10B, the method of the temperature coefficient currents $I_{TC1}$-$I_{TC3}$ generating the temperature coefficient current $I_{TC1}$-$I_{TC3}$ shown in FIG. 10B is similar to that of generating the temperature coefficient current $I_{TC1}$ shown in FIG. 9B, which can be obtained by referring to above description.

The difference between FIG. 10B and FIG. 9B is that the size ratio K' of the temperature coefficient current triggering and generating device $TC_1$ is greater than those of the temperature coefficient current triggering and generating devices $TC_2$-$TC_3$, and thus the temperature coefficient current $I_{TC1}$ possesses more percentage of the total temperature coefficient current Iout' generated by analog superposing the temperature coefficient currents $I_{TC1}$-$I_{TC3}$ and the zero temperature coefficient current $I_{ZTC}$'; and the triggering temperature $T_{trigger}$' of the temperature coefficient current triggering and generating device $TC_3$ is different from the triggering temperatures $T_{trigger}$' of the temperature coefficient current triggering and generating devices $TC_1$-$TC_2$, such that the total temperature coefficient current Iout' has three temperature coefficient turning points. As a result, through properly design types of the temperature coefficient current triggering and generating devices $TC1$-$TC_N$, size ratio K' and the triggering temperature $T_{trigger}$', the total temperature coefficient current Iout' with multiple temperature coefficient turning points is obtained with simple current mirror design, so as to compensate the temperature effect due to non-ideal factors of different circuits.

In the prior art, the comparator generates temperature coefficient current via digital switching operations, such that the circuit is more complicated and the temperature coefficient current appears discontinuous neighboring the temperature coefficient turning point. In comparison, the temperature coefficient current triggering and generating device of the present invention utilizes the current mirror to perform current canceling, and thus the smoother temperature coefficient current is obtained with simpler circuit. Further more, the temperature coefficient current triggering generating module of the present invention is capable of designing and summing multiple temperature coefficient current triggering and generating devices, so as to generate the smoother total temperature coefficient current with multiple temperature coefficient turning points, which compensates the temperature effect due to non-ideal factors of different circuits.

To sum up, the present invention obtains the smoother temperature coefficient current via current canceling analog operation with simpler circuit, so as to meet practical requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device of triggering and generating temperature coefficient current, for generating a temperature coefficient current, the device comprising:

a positive temperature coefficient current generating unit, for generating a first positive temperature coefficient current;

a negative temperature coefficient current generating unit, for generating a first negative temperature coefficient current; and a triggering unit, for triggering to generate the temperature coefficient current according to a triggering temperature and a current difference between the first positive temperature coefficient current and the first negative temperature coefficient current;

wherein the triggering unit triggers to generate the temperature coefficient current having a negative temperature coefficient when an environment temperature is less than the triggering temperature;

wherein the positive temperature coefficient current generating unit comprises a first transistor of a first current mirror, and the first transistor comprises a gate, a drain and a source, wherein the gate is coupled to a gate of a second transistor of the first current mirror, for generating the first positive temperature coefficient current according to a second positive temperature coefficient current outputted by the second transistor;

wherein the negative temperature coefficient current generating unit comprises:

a third transistor, belonging to a second current mirror, comprising a gate, a drain and a source, the gate coupled to a gate of a fourth transistor of the second current mirror, for generating a third negative temperature coefficient current according to a second negative temperature coefficient current outputted by the fourth transistor; and a third current mirror, comprising:

a fifth transistor, comprising a gate, a drain and a source, the gate coupled to the drain, the drain coupled to the drain of the third transistor, for receiving the third negative temperature coefficient current at the drain; and a sixth transistor, comprising a gate, a drain and a source, the gate coupled to the fifth transistor of the gate, the drain coupled to the first transistor of the drain, for draining the first negative temperature coefficient current at the drain according to the third negative temperature coefficient current received by the fifth transistor.

2. The device of claim 1, wherein the first positive temperature coefficient current equals the first negative temperature coefficient current when an environment temperature equals the triggering temperature.

3. The device of claim 1, wherein the triggering unit triggers to generate the temperature coefficient current when an environment temperature is greater than the triggering temperature, and the temperature coefficient current is a positive temperature coefficient.

4. The device of claim 1, wherein the triggering unit triggers to output the temperature coefficient current.

5. The device of claim 1, wherein the triggering unit triggers to drain the temperature coefficient current.

6. The device of claim 1 further comprising a zero temperature coefficient current generating unit, for generating a zero temperature coefficient current according to the first positive temperature coefficient current; and the triggering unit triggers to generate the temperature coefficient current according to the triggering temperature and a current difference between the zero temperature coefficient current and the first negative temperature coefficient current.

7. The device of claim 1 further comprising a zero temperature coefficient current generating unit, for generating a zero temperature coefficient current according to the first negative temperature coefficient current; and the triggering unit triggers to generate the temperature coefficient current according to the triggering temperature and a current difference between the zero temperature coefficient current and the first positive temperature coefficient current.

8. The device of claim 1, wherein the triggering unit is a fourth current mirror, comprising:
   a seventh transistor, comprising a gate, a drain and a source, the gate coupled to the drain, the drain coupled between the drain of the first transistor and the drain of the sixth transistor, for outputting a fourth negative temperature coefficient current when an environment temperature is less than the triggering temperature, wherein the fourth negative temperature coefficient current equals subtracting the first positive temperature coefficient current from the first negative temperature coefficient current; and
   an eighth transistor, comprising a gate, a drain and a source, the gate coupled to the seventh transistor of the gate, for outputting the temperature coefficient current with negative temperature coefficient at the drain according to the fourth negative temperature coefficient current outputted by the seventh transistor.

9. The device of claim 8, wherein the first transistor, the second transistor, third transistor, the fourth transistor, seventh transistor and the eighth transistor are P-type metal oxide semiconductor (PMOS) transistors, while the fifth transistor and the sixth transistor are NMOS transistors.

10. The device of claim 1 further comprising a zero temperature coefficient current generating unit which comprises the positive temperature coefficient current generating unit and a transistor; a gate of the transistor is coupled to the gate of the fourth transistor of the second current mirror, for generating a negative temperature coefficient current according to the second negative temperature coefficient current outputted by the fourth transistor; and the zero temperature coefficient current generating unit generates a zero temperature coefficient current according to the first positive temperature coefficient current and the negative temperature coefficient current.

11. The device of claim 10, wherein the triggering unit is a fourth current mirror, comprising:
   a seventh transistor, comprising a gate, a drain and a source, the gate coupled to the drain, the drain coupled between the drain of the first transistor and the drain of the sixth transistor, for outputting a fourth negative temperature coefficient current when an environment temperature is less than the triggering temperature, wherein the fourth negative temperature coefficient current equals subtracting the zero temperature coefficient current from the first negative temperature coefficient current; and
   an eighth transistor, comprising a gate, a drain and a source, the gate coupled to the gate of the seventh transistor, for outputting the temperature coefficient current with negative temperature coefficient at the drain according to the fourth negative temperature coefficient current outputted by the seventh transistor.

12. The device of claim 1, wherein the triggering unit is a fourth current mirror, comprising:
   a seventh transistor, comprising a gate, a drain and a source, the gate coupled to the drain, the drain coupled between the drain of the first transistor and the drain of the sixth transistor, for draining a third positive temperature coefficient current when an environment temperature is greater than the triggering temperature, wherein the third positive temperature coefficient current equals subtracting the first negative temperature coefficient current from the first positive temperature coefficient current; and
   an eighth transistor, comprising a gate, a drain and a source, the gate coupled to the gate of the seventh transistor, for draining the temperature coefficient current with positive temperature coefficient at the drain according to the third positive temperature coefficient current drained by the seventh transistor.

13. The device of claim 12, wherein the first transistor, the second transistor, third transistor and the fourth transistor are P-type metal oxide semiconductor (PMOS) transistors, while the fifth transistor, the sixth transistors, seventh transistor and the eighth transistor are NMOS transistors.

14. The device of claim 1 further comprising a zero temperature coefficient current generating unit which comprises the negative temperature coefficient current generating unit and a transistor; a gate of the transistor is coupled to the gate of the second transistor of the first current mirror, for generating a positive temperature coefficient current according to the second positive temperature coefficient current outputted by the second transistor; and the zero temperature coefficient current generating unit generates a zero temperature coefficient current according to the first negative temperature coefficient current and the positive temperature coefficient current.

15. The device of claim 14, wherein the triggering unit is a fourth current mirror, comprising:
   a seventh transistor, comprising a gate, a drain and a source, the gate coupled to the drain, the drain coupled between the drain of the first transistor and the drain of the sixth transistor, for draining a third positive temperature coefficient current when an environment temperature is greater than the triggering temperature, wherein the third positive temperature coefficient current equals subtracting the zero temperature coefficient current from the first positive temperature coefficient current; and
   an eighth transistor, comprising a gate, a drain and a source, the gate coupled to the gate of the seventh transistor, for draining the temperature coefficient current with positive temperature coefficient at the drain according to the third positive temperature coefficient current drained by the seventh transistor.

16. The device of claim 1 further comprising an impedance element, for generating a temperature coefficient voltage according to the temperature coefficient current.

17. A temperature coefficient current triggering and generating module, for generating a total temperature coefficient current, comprising:
   a plurality of temperature coefficient current triggering and generating devices, for generating a plurality of temperature coefficient currents, respectively, each temperature coefficient current triggering and generating devices comprises:
      a positive temperature coefficient current generating unit, for generating a first positive temperature coefficient current;
      a negative temperature coefficient current generating unit, for generating a first negative temperature coefficient current; and
      a triggering unit, for triggering to generate the temperature coefficient current according to a triggering temperature and a current difference between the first positive temperature coefficient current and the first negative temperature coefficient current; and a summation unit, for summing the plurality of temperature coefficient currents, to generate the total temperature coefficient current.

18. The module of claim 17, wherein the first positive temperature coefficient current equals the first negative temperature coefficient current when an environment temperature equals the triggering temperature.

19. The module of claim 17, wherein the triggering unit triggers to generate the temperature coefficient current when an environment temperature is less than the triggering temperature.

20. The module of claim 17, wherein the triggering unit triggers to generate the temperature coefficient current when an environment temperature is greater than the triggering temperature, and the temperature coefficient current has positive temperature coefficient.

21. The module of claim 17, wherein the triggering unit triggers to output the temperature coefficient current.

22. The module of claim 17, wherein the triggering unit triggers to drain the temperature coefficient current.

23. The module of claim 17, wherein each of the temperature coefficient current triggering and generating device further comprises a zero temperature coefficient current generating unit, for generating a zero temperature coefficient current according to the first positive temperature coefficient current; and the triggering unit triggers to generate the temperature coefficient current according to the triggering temperature and a current difference between the zero temperature coefficient current and the first negative temperature coefficient current.

24. The module of claim 17, wherein each of the temperature coefficient current triggering and generating device further comprises a zero temperature coefficient current generating unit, for generating a zero temperature coefficient current according to the first negative temperature coefficient current; and the triggering unit triggers to generate the temperature coefficient current according to the triggering temperature and a current difference between the zero temperature coefficient current and the first positive temperature coefficient current.

25. The module of claim 17, wherein the positive temperature coefficient current generating unit comprises a first transistor of a first current mirror, comprising a gate, a drain and a source, the gate coupled to a gate of a second transistor of the first current mirror, for generating the first positive temperature coefficient current according to a second positive temperature coefficient current outputted by the second transistor.

26. The module of claim 25, wherein the negative temperature coefficient current generating unit comprising:
a third transistor, belonging to a second current mirror, comprising a gate, a drain and a source, the gate coupled to a gate of a fourth transistor of the second current mirror, for generating a third negative temperature coefficient current according to a second negative temperature coefficient current outputted by the fourth transistor; and
a third current mirror, comprising:
a fifth transistor, comprising a gate, a drain and a source, the gate coupled to the drain, and the drain is coupled to the drain of the third transistor, for receiving the third negative temperature coefficient current at the drain; and
a sixth transistor, comprising a gate, a drain and a source, the gate coupled to the gate of the fifth transistor, and the drain is coupled to the drain of the first transistor, for draining the first negative temperature coefficient current at the drain according to the third negative temperature coefficient current received by the fifth transistor.

27. The module of claim 26, wherein the triggering unit is a fourth current mirror, comprising:
a seventh transistor, comprising a gate, a drain and a source, the gate coupled to the drain, the drain coupled between the drain of the first transistor and the drain of the sixth transistor, for outputting a fourth negative temperature coefficient current when an environment temperature is less than the triggering temperature, wherein the fourth negative temperature coefficient current equals subtracting the first positive temperature coefficient current from the first negative temperature coefficient current; and
an eighth transistor, comprising a gate, a drain and a source, the gate coupled to the gate of the seventh transistor, for outputting the temperature coefficient current with negative temperature coefficient at the drain according to the fourth negative temperature coefficient current outputted by the seventh transistor.

28. The module of claim 27, wherein the first transistor, the second transistor, third transistor, the fourth transistor, seventh transistor and the eighth transistor are P-type metal oxide semiconductor (PMOS) transistors, while the fifth transistor and the sixth transistor are NMOS transistors.

29. The module of claim 26, wherein each of the temperature coefficient current triggering and generating device further comprises a zero temperature coefficient current generating unit which comprises the positive temperature coefficient current generating unit and a transistor; a gate of the transistor is coupled to the gate of the fourth transistor of the second current mirror, for generating a negative temperature coefficient current according to the second negative temperature coefficient current outputted by the fourth transistor; and the zero temperature coefficient current generating unit generates a zero temperature coefficient current according to the first positive temperature coefficient current and the negative temperature coefficient current.

30. The module of claim 29, wherein the triggering unit is a fourth current mirror, comprising:
a seventh transistor, comprising a gate, a drain and a source, the gate coupled to the drain, the drain coupled between the drain of the first transistor and the drain of the sixth transistor, for outputting a fourth negative temperature coefficient current when an environment temperature is less than the triggering temperature, wherein the fourth negative temperature coefficient current equals subtracting the zero temperature coefficient current from the first negative temperature coefficient current; and
an eighth transistor, comprising a gate, a drain and a source, the gate coupled to the gate of the seventh transistor, for outputting the temperature coefficient current with negative temperature coefficient at the drain according to the fourth negative temperature coefficient current outputted by the seventh transistor.

31. The module of claim 26, wherein the triggering unit is a fourth current mirror, comprising:
a seventh transistor, comprising a gate, a drain and a source, the gate coupled to the drain, the drain coupled between the drain of the first transistor and the drain of the sixth transistor, for draining a third positive temperature coefficient current when an environment temperature is greater than the triggering temperature, wherein the third positive temperature coefficient current equals subtracting the first negative temperature coefficient current from the first positive temperature coefficient current; and an eighth transistor, comprising a gate, a drain and a source, the gate coupled to the gate of the seventh transistor, for draining the temperature coefficient current with positive temperature coefficient at the drain according to the third positive temperature coefficient current drained by the seventh transistor.

32. The module of claim 31, wherein the first transistor, the second transistor, third transistor and the fourth transistor are P-type metal oxide semiconductor (PMOS) transistors, while the fifth transistor, the sixth transistor, seventh transistor and the eighth transistor are NMOS transistors.

33. The module of claim 26, wherein each of the temperature coefficient current triggering and generating device further comprises a zero temperature coefficient current generating unit which comprises the negative temperature coefficient current generating unit and a transistor; a gate of the transistor is coupled to the gate of the second transistor of the first current mirror, for generating a positive temperature coefficient current according to the second positive temperature coefficient current outputted by the second transistor; and the zero temperature coefficient current generating unit generates a zero temperature coefficient current according to the first negative temperature coefficient current and the positive temperature coefficient current.

34. The module of claim 33, wherein the triggering unit is a fourth current mirror, comprising:
a seventh transistor, comprising a gate, a drain and a source, the gate coupled to the drain, the drain coupled between the drain of the first transistor and the drain of the sixth transistor, for draining a third positive temperature coefficient current when an environment temperature is greater than the triggering temperature, wherein the third positive temperature coefficient current equals subtracting the zero temperature coefficient current from the first positive temperature coefficient current; and
an eighth transistor, comprising a gate, a drain and a source, the gate coupled to the seventh transistor of the gate, for draining the temperature coefficient current with positive temperature coefficient at the drain according to the third positive temperature coefficient current drained by the seventh transistor.

35. The module of claim 17, wherein the negative temperature coefficient current generating unit comprises a first transistor of a first current mirror, comprising a gate, a drain and a source, the gate coupled to a gate of a second transistor of the first current mirror, for generating the first negative temperature coefficient current according to a second negative temperature coefficient current outputted by the second transistor.

36. The module of claim 35, wherein the positive temperature coefficient current generating unit comprising:
a third transistor, belonging to a second current mirror, comprising a gate, a drain and a source, the gate coupled to a gate of a fourth transistor of the second current mirror, for generating a third positive temperature coefficient current according to a second positive temperature coefficient current outputted by the fourth transistor; and
a third current mirror, comprising:
a fifth transistor, comprising a gate, a drain and a source, the gate coupled to the drain, and the drain is coupled to the drain of the third transistor, for receiving the third positive temperature coefficient current at the drain; and
a sixth transistor, comprising a gate, a drain and a source, the gate coupled to the gate of the fifth transistor, and the drain is coupled to the drain of the first transistor, for draining the first positive temperature coefficient current at the drain according to the third positive temperature coefficient current received by fifth transistor.

37. The module of claim 36, wherein the triggering unit is a fourth current mirror, comprising:
a seventh transistor, comprising a gate, a drain and a source, the gate coupled to the drain, the drain coupled between the drain of the first transistor and the drain of the sixth transistor, for outputting a fourth positive temperature coefficient current when an environment temperature is greater than the triggering temperature, wherein the fourth positive temperature coefficient current equals subtracting the first negative temperature coefficient current from the first positive temperature coefficient current; and
an eighth transistor, comprising a gate, a drain and a source, the gate coupled to the gate of the seventh transistor, for outputting the temperature coefficient current with positive temperature coefficient at the drain according to the fourth positive temperature coefficient current outputted by the seventh transistor.

38. The module of claim 37, wherein the first transistor, the second transistor, third transistor, the fourth transistor, seventh transistor and the eighth transistor are P-type metal oxide semiconductor (PMOS) transistors, while the fifth transistor and the sixth transistor are NMOS transistors.

39. The module of claim 36, wherein each of the temperature coefficient current triggering and generating device further comprises a zero temperature coefficient current generating unit which comprises the negative temperature coefficient current generating unit and a transistor; a gate of the transistor is coupled to the gate of the fourth transistor of the second current mirror, for generating a positive temperature coefficient current according to the second positive temperature coefficient current outputted by the fourth transistor; and the zero temperature coefficient current generating unit generates a zero temperature coefficient current according to the first negative temperature coefficient current and the positive temperature coefficient current.

40. The module of claim 39, wherein the triggering unit is a fourth current mirror, comprising:
a seventh transistor, comprising a gate, a drain and a source, the gate coupled to the drain, the drain coupled between the drain of the first transistor and the drain of the sixth transistor, for outputting a fourth positive temperature coefficient current when an environment temperature is greater than the triggering temperature, wherein the fourth positive temperature coefficient current equals subtracting the zero temperature coefficient current from the first positive temperature coefficient current; and
an eighth transistor, comprising a gate, a drain and a source, the gate coupled to the gate of the seventh transistor, for outputting the temperature coefficient current with positive temperature coefficient at the drain according to the fourth positive temperature coefficient current outputted by the seventh transistor.

41. The module of claim 36, wherein the triggering unit is a fourth current mirror, comprising:
a seventh transistor, comprising a gate, a drain and a source, the gate coupled to the drain, the drain coupled between the drain of the first transistor and the drain of the sixth transistor, for draining a third negative temperature coefficient current when an environment temperature is less than the triggering temperature, wherein the third negative temperature coefficient current equals subtracting the first positive temperature coefficient current from the first negative temperature coefficient current; and an eighth transistor, comprising a gate, a drain and a source, the gate coupled to the gate of the seventh transistor, for draining the temperature coefficient current with negative temperature coefficient at the drain according to the third negative temperature coefficient current drained by the seventh transistor.

42. The module of claim 41, wherein the first transistor, the second transistor, third transistor and the fourth transistor are P-type metal oxide semiconductor (PMOS) transistors, while the fifth transistor, the sixth transistor, seventh transistor and the eighth transistor are NMOS transistors.

43. The module of claim 36, wherein each of the temperature coefficient current triggering and generating device further comprises a zero temperature coefficient current generating unit which comprises the positive temperature coefficient current generating unit and a transistor; a gate of the transistor is coupled to the gate of the second transistor of the first current mirror, for generating a negative temperature coefficient current according to the second negative temperature coefficient current outputted by the second transistor; and the zero temperature coefficient current generating unit generates a zero temperature coefficient current according to the first positive temperature coefficient current and the negative temperature coefficient current.

44. The module of claim 43, wherein the triggering unit is a fourth current mirror, comprising:

a seventh transistor, comprising a gate, a drain and a source, the gate coupled to the drain, the drain coupled between the drain of the first transistor and the drain of the sixth transistor, for draining a third negative temperature coefficient current when an environment temperature is less than the triggering temperature, wherein the third negative temperature coefficient current equals subtracting the zero temperature coefficient current from the first positive temperature coefficient current; and an eighth transistor, comprising a gate, a drain and a source, the gate coupled to the gate of the seventh transistor, for draining the temperature coefficient current with positive temperature coefficient at the drain according to the third positive temperature coefficient current drained by the seventh transistor.

45. The module of claim 17 further comprising an impedance element, for generating a total temperature coefficient voltage according to the total temperature coefficient current.

\* \* \* \* \*